(12) United States Patent
Min et al.

(10) Patent No.: US 12,331,838 B2
(45) Date of Patent: Jun. 17, 2025

(54) FLOW PATH SWITCHING DEVICE

(71) Applicant: LG ELECTRONICS INC., Seoul (KR)

(72) Inventors: Junho Min, Seoul (KR); Sungbae Song, Seoul (KR); Moonkee Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 18/028,339

(22) PCT Filed: Sep. 28, 2021

(86) PCT No.: PCT/KR2021/013253
§ 371 (c)(1),
(2) Date: Mar. 24, 2023

(87) PCT Pub. No.: WO2022/071723
PCT Pub. Date: Apr. 7, 2022

(65) Prior Publication Data
US 2023/0228336 A1    Jul. 20, 2023

(30) Foreign Application Priority Data
Sep. 29, 2020 (KR) .................. 10-2020-0127166

(51) Int. Cl.
*F16K 11/076* (2006.01)
*F16K 11/00* (2006.01)
(Continued)

(52) U.S. Cl.
CPC ............ *F16K 11/076* (2013.01); *F16K 11/00* (2013.01); *F16K 11/0856* (2013.01);
(Continued)

(58) Field of Classification Search
CPC .... F16K 11/00; F16K 11/076; F16K 11/0856; F16K 27/003; F16K 31/041; F25B 13/00;
(Continued)

(56) References Cited

U.S. PATENT DOCUMENTS 4,355,659 A * 10/1982 Kelchner ............ F16K 11/0856
137/625.19
4,445,540 A *  5/1984 Baron ..................... F16L 45/00
137/625.43
(Continued)

FOREIGN PATENT DOCUMENTS

EP    3 517 855    7/2019
JP    09-079396    3/1997
(Continued)

OTHER PUBLICATIONS

International Search Report (English Translation) dated Jan. 19, 2022 issued in Application No. PCT/KR2021/013253.

*Primary Examiner* — William M McCalister
(74) *Attorney, Agent, or Firm* — KED & ASSOCIATES, LLP

(57) ABSTRACT

A flow path switching device of the present disclosure includes a case comprising a first nozzle into which fluid flows from an indoor unit, a second nozzle which sends fluid to the indoor unit, a plurality of inner outflow pipes through which fluid supplied from the first nozzle flows, a plurality of inner inflow pipes through which the fluid supplied to the second nozzle flows, and a flow path connection portion in which a space is formed to communicate the plurality of inner outflow pipes with the first nozzle or to communicate the plurality of inner inflow pipes with the second nozzle; a valve which is rotatably disposed in the space of the flow path connection portion, and has a first chamber connecting one of the plurality of inner inflow pipes and the first nozzle according to disposition, and a second chamber connecting (Continued)

one of the plurality of inner outflow pipes and the second nozzle according to disposition; and a motor which is disposed in one side of the valve, and rotates the valve, wherein the plurality of inner outflow pipes and the plurality of inner inflow pipes are disposed in the same one side direction of the flow path connection portion and are spaced apart from each other in a direction in which a rotation shaft around which the valve rotates is formed.

19 Claims, 16 Drawing Sheets

(51) Int. Cl.
| | | |
|---|---|---|
| F16K 11/085 | (2006.01) | |
| F16K 27/00 | (2006.01) | |
| F16K 31/04 | (2006.01) | |
| F24F 11/84 | (2018.01) | |
| F25B 25/00 | (2006.01) | |
| F25B 41/20 | (2021.01) | |
| F25B 13/00 | (2006.01) | |

(52) U.S. Cl.
CPC .......... *F16K 27/003* (2013.01); *F16K 31/041* (2013.01); *F24F 11/84* (2018.01); *F25B 25/005* (2013.01); *F25B 41/20* (2021.01); *F25B 13/00* (2013.01); *F25B 2313/003* (2013.01); *F25B 2313/007* (2013.01); *F25B 2313/0233* (2013.01); *F25B 2600/2507* (2013.01); *Y02B 30/70* (2013.01)

(58) Field of Classification Search
CPC .. F25B 25/005; F25B 41/20; F25B 2313/003; F25B 2313/007; F25B 2313/0233; F25B 2600/2507; Y10T 137/86871; F24F 11/84; Y02B 30/70

USPC .................................................... 137/625.47
See application file for complete search history.

(56) References Cited

U.S. PATENT DOCUMENTS

| | | | | |
|---|---|---|---|---|
| 4,716,923 | A * | 1/1988 | West .................... | F16K 11/0856 137/625.29 |
| 5,820,133 | A * | 10/1998 | Altshuler ............ | F16K 11/0856 277/630 |
| 6,308,739 | B1 * | 10/2001 | Barbuto ................ | F16K 5/0478 137/625.11 |
| 6,994,316 | B2 * | 2/2006 | Pervaiz ................. | F16K 11/085 251/175 |
| 8,813,783 | B2 * | 8/2014 | Morris ................ | F16K 11/0856 137/625.18 |
| 8,905,076 | B2 * | 12/2014 | Jorgensen ........... | F16K 11/0856 237/12.3 B |
| 10,215,452 | B2 * | 2/2019 | Ogawa .................. | F16K 11/076 |
| 10,330,208 | B2 * | 6/2019 | Takamatsu ............. | F16K 27/06 |
| 11,042,171 | B2 * | 6/2021 | Drees ....................... | F24F 11/62 |
| 11,359,842 | B2 * | 6/2022 | Kim ....................... | F25B 41/40 |
| 2012/0048411 | A1 * | 3/2012 | Steyer ................. | F16K 11/0856 137/625 |
| 2013/0134341 | A1 * | 5/2013 | Cheng ................. | F15B 13/0406 251/304 |
| 2016/0003490 | A1 * | 1/2016 | Motomura .............. | F25B 13/00 62/196.1 |
| 2017/0191574 | A1 * | 7/2017 | Takamatsu ............ | F16K 11/076 |
| 2017/0191706 | A1 * | 7/2017 | Ogawa .................. | F25B 41/20 |
| 2017/0254425 | A1 * | 9/2017 | Takamatsu ............ | F16K 37/005 |
| 2023/0228336 | A1 * | 7/2023 | Min ..................... | F25B 25/005 137/625.47 |

FOREIGN PATENT DOCUMENTS

| | | |
|---|---|---|
| JP | 5236009 | 7/2013 |
| JP | 2017-172773 | 9/2017 |
| JP | 6192706 | 9/2017 |

\* cited by examiner

FLOW PATH SWITCHING DEVICE

CROSS-REFERENCE TO RELATED PATENT APPLICATIONS

This application is a U.S. National Stage Application under 35 U.S.C. § 371 of PCT Application No. PCT/KR2021/013253, filed Sep. 28, 2021, which claims priority to Korean Patent Application No. 10-2020-0127166, filed Sep. 29, 2020, whose entire disclosures are hereby incorporated by reference.

TECHNICAL FIELD

The present disclosure relates to an air conditioner, and more particularly, to an air conditioner including a flow path switching device.

BACKGROUND ART

An air conditioner is an apparatus for maintaining the air in a certain space in the most suitable condition according to a use and a purpose. The air conditioner includes a compressor, a condenser, an expansion device, and an evaporator, and a refrigeration cycle that performs compression, condensation, expansion, and evaporation of refrigerant is driven to cool or heat the certain space.

In recent years, the type of refrigerant used in air conditioners and the amount of refrigerant charge are restricted according to environmental regulation policies. In addition, in order to secure safety from refrigerant leakage, etc., there is a movement to restrict a refrigerant line circulated in an air conditioner from installing in an indoor space.

Accordingly, a technique for controlling the temperature of an indoor space by adding a line using water to reduce the amount of refrigerant used in the air conditioner and to remove the refrigerant line to the indoor space has been proposed.

Prior Art JP 5236009 discloses an air conditioner capable of adjusting the temperature of an indoor space by exchanging heat between a refrigerant and water and supplying the heat-exchanged water to a plurality of indoor units.

Here, a valve may be provided to send water that exchanged heat with the refrigerant to each of the plurality of indoor units.

JP 6192706 discloses a flow path switching device for individually supplying water that flows after being cooled or heated through two heat exchangers to each of a plurality of indoor units.

However, in the flow path switching device disclosed in the above document, a water pipe connected to the heat exchanger is formed in the vertical direction based on a valve for switching the flow path. Accordingly, in order to install a plurality of valves for connection with a plurality of indoor units, there is a spatial restriction in that the valves should be disposed only in the extending direction.

Inside the valve, since the nozzle through which the water supplied from the indoor unit flows into and the water pipe for flowing to the heat exchanger are spaced apart from each other, a space for moving water increases.

Accordingly, there is a problem of increasing the amount of water required for the water pipe and a problem in that flow resistance occurs as the flow path through which the water flows is abruptly bent to flow water.

DISCLOSURE

Technical Problem

An object of the present disclosure may provide a flow path switching device that can be transformed variously, and transformed and adjusted in shape according to the size or shape of a space in which it is placed.

Another object of the present disclosure may minimize the amount of fluid flowing through a water pipe by minimizing a space in which the fluid flows in a valve. That is, the disclosure may minimize an area where the fluid flows in an area excluding the heat exchanger, thereby preventing heat from being lost or emitted during the movement of a fluid.

Another object of the present disclosure may minimize the flow loss of the fluid flowing inside a valve. That is, the disclosure may provide a flow path switching device that minimizes the flow loss occurring in a process of changing a flow path in various directions inside a valve.

The objects of the present disclosure are not limited to the object mentioned above, and other objects not mentioned will be clearly understood by those skilled in the art from the following description.

Technical Solution

The flow path switching device of the present disclosure is a device for supplying a fluid heat-exchanged with a heat exchanger disposed in a relay device to an indoor unit. The temperature of the indoor space can be adjusted by selectively supplying each of the fluids heat-exchanged with a plurality of heat exchangers to the indoor unit.

A flow path switching device according to an embodiment of the present disclosure includes a case including a plurality of nozzles, a plurality of inner outflow pipes connected to each of the plurality of nozzles, a plurality of inner inflow pipes, and a flow path connection portion in which a valve is rotatably disposed; the valve rotatably disposed inside the flow path connection portion; and a motor for rotating the valve.

In the flow path switching device of the present disclosure, each of the plurality of inner outflow pipes and the plurality of inner inflow pipes is disposed parallel to the rotation shaft around which the valve rotates so that various forms of deformation are possible. That is, it has a structure that the case can be deformed so that the nozzle is disposed in the vertical direction of the plurality of inner outflow pipes and the plurality of inner inflow pipes, or the nozzle is disposed in one side direction.

The first nozzle is disposed between the first inner outflow pipe and the second inner outflow pipe in a direction in which the rotation shaft of the valve extends, so that a movement amount of the fluid flowing from a first nozzle may be minimized.

The plurality of inner outflow pipes include a first inner outflow pipe through which fluid flows to a first heat exchanger and a second inner outflow pipe through which fluid flows to a second heat exchanger, wherein the first inner outflow pipe and the second inner outflow pipe are disposed in an opposite direction to the first nozzle based on the rotation shaft of the valve, so that flow loss of the fluid discharged from the first nozzle can be reduced.

The first inner outflow pipe and the second inner outflow pipe are spaced apart from each other in a direction parallel to the rotation shaft of the valve, and in the first nozzle, a first nozzle hole opened in a direction perpendicular to the rotation shaft of the valve is formed between the first inner outflow pipe and the second inner outflow pipe spaced apart from each other, so that the movement range of the fluid flowing through the first nozzle hole may be minimized.

The valve includes a guide plate forming an inclined surface to guide the fluid flowing from the first nozzle to the first inner outflow pipe or the second inner outflow pipe, so that flow loss of the fluid flowing to the inside of the valve through the first nozzle can be minimized.

The guide plate is disposed below the first nozzle to send the fluid supplied to the first nozzle to the first inner outflow pipe or the second inner outflow pipe according to disposition of the valve, so that the fluid supplied from the first nozzle may flow along the guide plate and flow into the first inner outflow pipe or the second inner outflow pipe.

The guide plate has one end which is in contact with one end portion of the first nozzle to guide the fluid supplied from the first nozzle to the first inner outflow pipe, and the other end which is in contact with the other end portion of the first nozzle to guide the fluid supplied from the first nozzle to the second inner outflow pipe, so that the fluid flowing through the first nozzle is selectively supplied to the first inner outflow pipe or the second inner outflow pipe, and is not simultaneously supplied.

A first outflow hole communicating with the first space of the flow path connection portion is formed in the first inner outflow pipe, a second outflow hole communicating with the first space of the flow path connection portion is formed in the second inner outflow pipe, the first nozzle hole is formed in an inner range of one end and the other end of the guide plate, and the first outflow hole and the second outflow hole are formed in an outer range of one end and the other end of the guide plate, so that the fluid flowing through the first nozzle is selectively supplied to the first inner outflow pipe or the second inner outflow pipe, and is not simultaneously supplied.

The valve includes a valve body which forms an outer shape, and has a first chamber connecting one of the plurality of inner outflow pipes and the first nozzle, and a second chamber connecting one of the plurality of inner inflow pipes and the second nozzle formed therein; and a partition plate which is disposed inside the valve body, and partitions the first chamber and the second chamber, so that a fluid supplied to the indoor unit and a fluid flowed from the indoor unit may be distinguished.

A guide plate forming an inclined surface is disposed, in the first chamber, to guide the fluid flowing from the first nozzle to the first inner outflow pipe or the second inner outflow pipe, a first upper hole and a second lower hole, which are formed in an opposite direction in one end of the guide plate, are formed in one side of the valve body, a second upper hole and a first lower hole, which are formed in an opposite direction in the other end of the guide plate, are formed in the other side of the valve body, and each of the first upper hole and the first lower hole, when disposed adjacent to the first nozzle, communicates with a first nozzle hole formed in the first nozzle, so that with the guide plate as a boundary, the first upper hole and the first lower hole may be connected, and the second upper hole and the second lower hole may be connected.

The first upper hole communicates with the first nozzle hole or the first inner outflow pipe according to disposition of the valve, the second upper hole communicates with the first nozzle hole or the second inner outflow pipe according to disposition of the valve, the first lower hole communicates with the first inner outflow pipe according to disposition of the valve, and the second lower hole communicates with the second inner outflow pipe according to disposition of the valve, so that the fluid supplied through the first nozzle may flow into the first inner outflow pipe or the second inner outflow pipe.

The first upper hole and the first lower hole are disposed to face each other, the second upper hole and the second lower hole are disposed to face each other, the first upper hole and the second lower hole are disposed parallel to the rotation shaft of the valve, and the second upper hole and the first lower hole are disposed parallel to the rotation shaft of the valve, so that with the guide plate as a boundary, the first upper hole and the first lower hole may be connected, and the second upper hole and the second lower hole may be connected.

The plurality of inner inflow pipes include a first inner inflow pipe through which fluid heat-exchanged with a refrigerant flows through a first heat exchanger, and a second inner inflow pipe through which fluid heat-exchanged with a refrigerant flows through a second heat exchanger, wherein the first inner inflow pipe and the second inner inflow pipe are disposed parallel to the rotation shaft of the valve, so that when a plurality of flow path connection portions are disposed, various modifications of the case are possible.

The second nozzle is extended in a direction parallel to the rotation shaft of the valve, in a distal end of the flow path connection portion.

A first inflow hole communicating with the second space is formed in the first inner inflow pipe, a second inflow hole communicating with the second space is formed in the second inner inflow pipe, and a first valve hole communicating with the first inflow hole according to disposition of the valve, a second valve hole communicating with the second inflow hole according to disposition of the valve, and a third valve hole communicating with the second nozzle are formed in the valve body, so that fluid supplied to the indoor unit may be supplied through one of the first inflow hole and the second inflow hole.

The case includes a plurality of flow path connection portions spaced apart from each other in a direction in which the plurality of inner inflow pipes and the plurality of inner outflow pipes are extended, so that the plurality of flow path connection portions may have a structure in which the plurality of inner inflow pipes and the plurality of inner outflow pipes are extended.

The flow path switching device includes a case including a first upper nozzle into which fluid flows from a first indoor unit, a second upper nozzle which sends fluid to the first indoor unit, a first lower nozzle into which fluid flows from a second indoor unit, a second lower nozzle which sends fluid to the second indoor unit, a plurality of inner outflow pipes through which fluid supplied from the first upper nozzle or the first lower nozzle flows, a plurality of inner inflow pipes through which fluid supplied to the second upper nozzle or the second lower nozzle flows, a first flow path connection portion which has an upper space for communicating the plurality of inner outflow pipes and the first upper nozzle or communicating the plurality of inner inflow pipes and the second upper nozzle, and a second flow path connection portion which has a lower space for communicating the plurality of inner outflow pipes and the first lower nozzle or communicating the plurality of inner inflow pipes and the second lower nozzle; a first valve which is rotatably disposed in the upper space of the first flow path connection portion, connects one of the plurality of inner inflow pipes and the first upper nozzle according to disposition, and connects one of the plurality of inner outflow pipes and the second upper nozzle; a second valve which is rotatably disposed in the lower space of the second flow path connection portion, connects one of the plurality of inner inflow pipes and the first lower nozzle according to disposition, and connects one of the plurality of inner outflow pipes and the second lower nozzle; a first motor which is disposed in one side of the first valve, and rotates the first valve; and a second motor which is disposed in one side of the second valve, and rotates the second valve, wherein the plurality of inner outflow pipes and the plurality of inner inflow pipes are disposed between the first flow path connection portion and the second flow path connection portion, and disposed spaced apart from each other in a direction in which a first rotation shaft on which the first valve rotates or a second rotation shaft on which the second valve rotates is formed, so that a plurality of flow path connection portions may be disposed in a vertical direction in the plurality of inner inflow pipes and the plurality of inner outflow pipes.

In each of the plurality of inner outflow pipes and the plurality of inner inflow pipes, a plurality of upper outflow holes and a plurality of upper inflow holes are formed in one side facing the first flow path connection portion, and a plurality of lower outflow holes and a plurality of lower inflow holes are formed in the other side facing the second flow path connection portion.

Details of other embodiments are included in the detailed description and drawings.

Advantageous Effects

According to the flow path switching device of the present disclosure, there are one or more of the following effects.

First, the flow path connection portion connected to the indoor unit can be disposed in only one side or in both sides of the plurality of inner inflow pipes and the plurality of inner outflow pipes, so that it can be modified and designed according to the size or shape of the space where the flow path switching device is disposed.

Second, the fluid flowing through the first nozzle is supplied to the plurality of inner outflow pipes via the guide plate, thereby minimizing the range in which the fluid flows inside the valve. Accordingly, there is also an advantage of preventing heat loss of the fluid in a range in which heat exchange is not performed.

Third, as the guide plate forms an inclined surface, the flow path of the fluid flowing through the first nozzle does not change rapidly, thereby minimizing the flow loss of the fluid flowing inside the valve.

The effects of the present disclosure are not limited to the effects mentioned above, and other effects not mentioned can be clearly understood by those skilled in the art from the description of the claims.

DESCRIPTION OF DRAWINGS

FIG. 7A is a view for explaining the flow of water through a first inner outflow pipe and a first inner inflow pipe connected to a first heat exchanger, FIG. 7B is a view for explaining the flow of water through a second inner outflow pipe and a second inner inflow pipe connected to a second heat exchanger, and FIG. 7C is a view showing a state in which a valve closes the flow path switching device.

FIG. 12A is a view for explaining the flow of water through a first inner outflow pipe and a first inner inflow pipe connected to a first heat exchanger, FIG. 12B is a view for explaining the flow of water through a second inner outflow pipe and a second inner inflow pipe connected to a second heat exchanger, and FIG. 12C is a view showing a state in which the valve closes the flow path switching device;

FIG. 13A is a view for explaining the flow of water through a first inner outflow pipe and a first inner inflow pipe connected to a first heat exchanger, and FIG. 13B is a view for explaining the flow of water through a second inner outflow pipe and a second inner inflow pipe connected to a second heat exchanger; FIG. 14A is a view for explaining the flow of water through a first inner outflow pipe and a first inner inflow pipe connected to a first heat exchanger, and FIG. 14B is a view for explaining the flow of water through a second inner outflow pipe and a second inner inflow pipe connected to a second heat exchanger.

MODE FOR INVENTION

Figure 1:
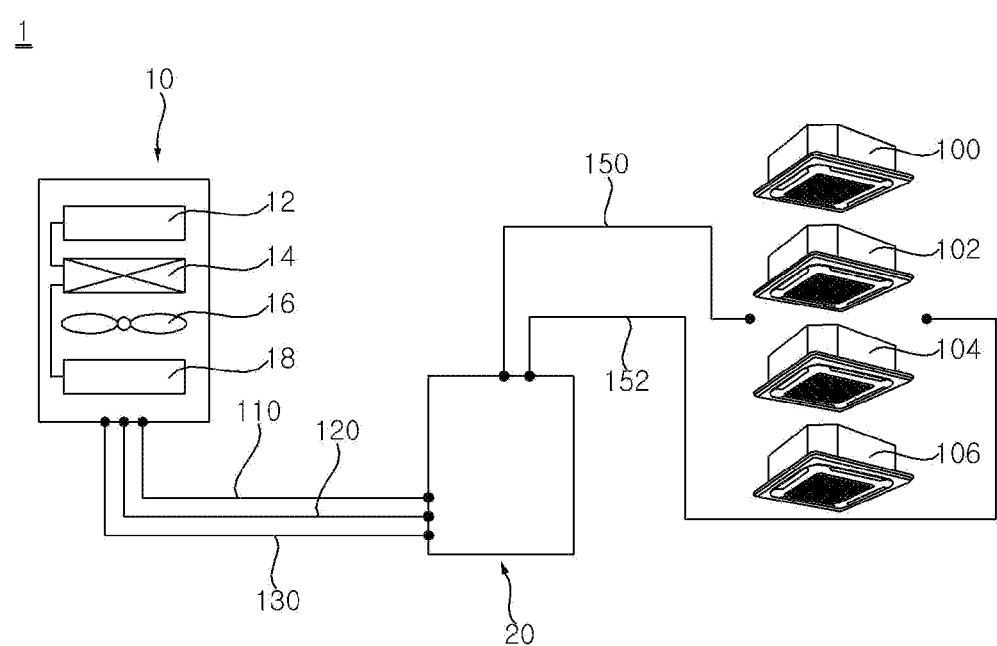
FIG. 1 is a schematic diagram of an air conditioner according to an embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and these embodiments are provided only to allow the disclosure of the present disclosure to be complete, and to completely inform those of ordinary skill in the art to which the present disclosure belongs, the scope of the invention, and the present disclosure is only defined by the scope of the claims. Like reference numerals refer to like elements throughout.

In FIGS. 3 to 12C, indications of up (U), down (D), left (Le), right (Ri), front (F), and rear (R) are for explanation of the disclosure and do not limit the disclosure. In a flow path switching device described in FIGS. 3 to 12C, a first direction (F-R), a second direction (U-D), and a third direction (Ri-Le) are directions perpendicular to each other and are a reference defined for description of the disclosure. It is obvious that this can be applied differently if the viewing direction or reference is different. "Upper" and "lower" used as terms in the description or claims are for describing the disclosure with reference to drawings according to embodiments, and do not limit a position.

Hereinafter, the present disclosure will be described with reference to drawings for explaining an air conditioner including a flow path switching device according to embodiments of the present disclosure.

<Overall Composition>

Referring to FIG. 1, an air conditioner 1 according to an embodiment of the present disclosure may include an outdoor unit 10, a plurality of indoor units 100, 102, 104, 106 connected to the outdoor unit 10 to adjust the temperature of an indoor space, and a relay device 20 in which a refrigerant circulating in the outdoor unit 10 and water circulating in the plurality of indoor units 100, 102, 104, 106 exchange heat.

The air conditioner 1 may include three refrigerant pipes 110, 120, and 130 connecting the outdoor unit 10 and the relay device 20. That is, the outdoor unit 10 and the relay device 20 may have a "three pipe connection structure". The refrigerant may circulate between the outdoor unit 10 and the relay device 20 through the three refrigerant pipes 110, 120, and 130.

The three refrigerant pipes 110, 120, and 130 may include a high-pressure gas pipe 110 through which high-pressure gaseous refrigerant flows, a low-pressure gas pipe 120 through which low-pressure gaseous refrigerant flows, and a liquid pipe 130 through which liquid refrigerant flows. The high-pressure gas pipe 110 may be connected to the discharge side of the compressor 12 disposed in the outdoor unit 10. The low pressure gas pipe 120 may be connected to a suction side of the compressor 12. The liquid pipe 130 may be connected to the outdoor heat exchanger 14 disposed in the outdoor unit 10.

The air conditioner 1 may include a plurality of water pipes connecting the relay device 20 and each of the plurality of indoor units 100, 102, 104, and 106. Each of the plurality of indoor units 100, 102, 104, and 106 may be connected to a water supply pipe 150 through which water is supplied from the relay device 20 and a water discharge pipe 152 through which water is discharged to the relay device 20. The water pipe includes a water supply pipe 150 and a water discharge pipe 152. The water supply pipe 150 and the water discharge pipe 152 may be provided to correspond to the number of indoor units 100, 102, 104, and 106.

The outdoor unit 10 may include a simultaneous cooling/heating type outdoor unit. The outdoor unit 10 and the relay device 20 may be fluidly connected by a first fluid. The first fluid may include a refrigerant.

The outdoor unit 10 may include a compressor 12 for compressing refrigerant, an outdoor heat exchanger 14 that is disposed inside the outdoor unit and exchanges heat between external air and the refrigerant, and an outdoor fan 16 that is disposed in one side of the outdoor heat exchanger 14 and forms air flow to the outdoor heat exchanger 14. Heat exchange between the refrigerant and the air may be achieved as the outdoor air flows into the outdoor heat exchanger 14 by the driving of the outdoor fan 16.

In addition, the outdoor unit 10 may further include an outdoor expansion valve 18 that expands the refrigerant that is discharged from the outdoor heat exchanger 14 or supplied to the outdoor heat exchanger 14.

The plurality of indoor units 100, 102, 104, and 106 may include a simultaneous heating/cooling type indoor unit. Each of the plurality of indoor units 100, 102, 104, and 106 and the relay device may be fluidly connected by a second fluid. The second fluid may include water.

Each of the plurality of indoor units 100, 102, 104, and 106 may include an indoor heat exchanger (not shown) disposed inside the indoor unit 100, 102, 104, and 106 to exchange heat between indoor air and water, and an indoor fan (not shown) disposed in one side of the indoor heat exchanger (not shown) to form an air flow to the indoor heat exchanger.

<Relay Device>

Figure 2:
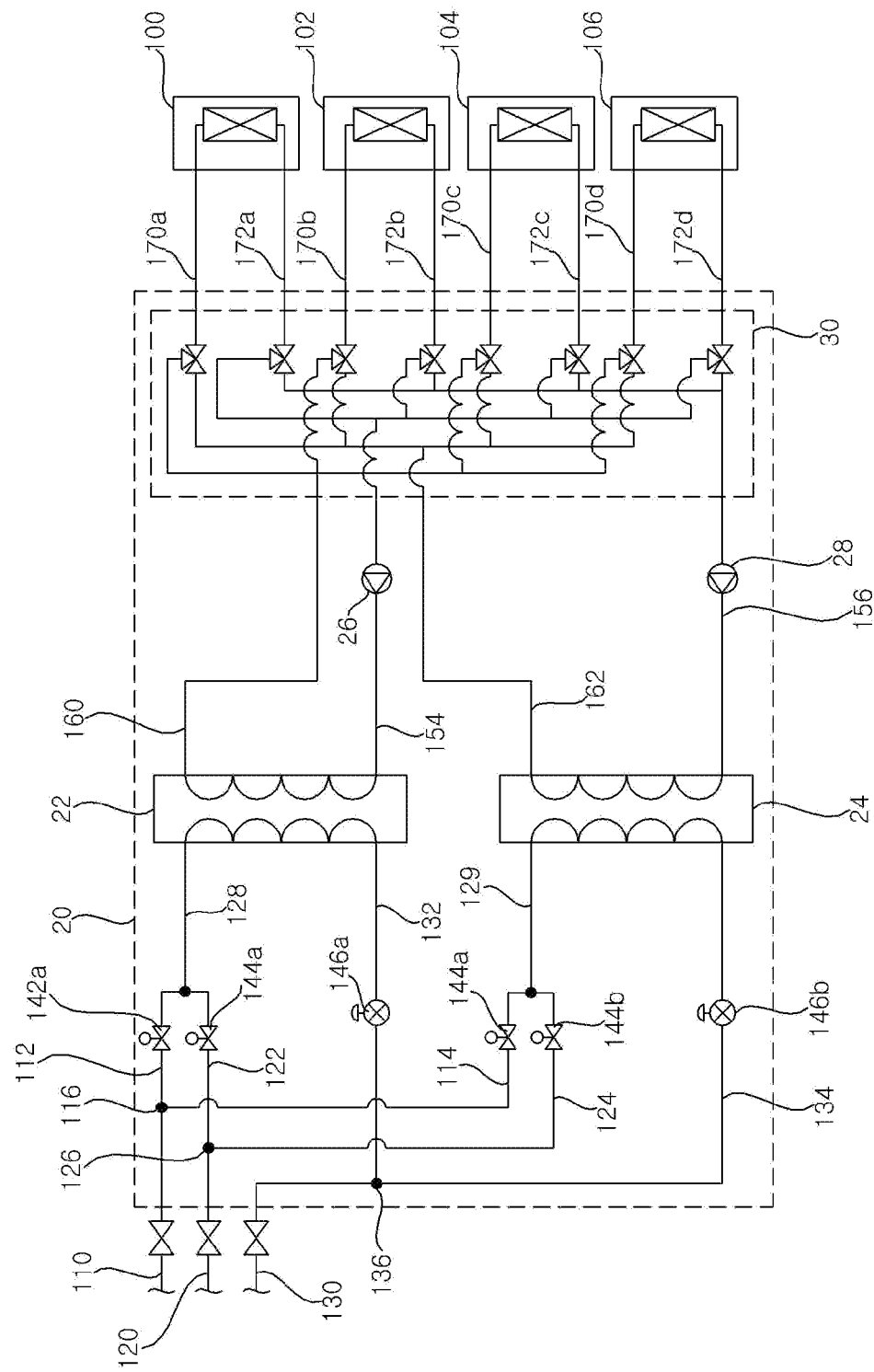
FIG. 2 is a schematic diagram illustrating a connection relationship between a relay device and a plurality of indoor units according to an embodiment of the present disclosure.

Referring to FIG. 2, the relay device 20 includes a heat exchanger 22, 24 for exchanging heat between the refrigerant and water, a pump 26, 28 for forming a flow of water flowing through the water pipe, a plurality of refrigerant valves that are disposed in the refrigerant pipe 110, 120, and 130 disposed inside the relay device 20 and control the flow of the refrigerant, and a flow path switching device 30 that is disposed in a water pipe disposed inside the relay device 20 and controls the flow of water.

Inside the relay device 20, the refrigerant pipe 110, 120, 130 connecting the outdoor unit 10 and the heat exchanger 22, 24, and the water pipe connecting the plurality of indoor units 100, 102, 104 and 106 and the heat exchanger 22, 24 are disposed.

Referring to FIG. 2, the refrigerant pipe 110, 120, 130 may include a high-pressure gas pipe 110 in which a high-pressure gaseous refrigerant flows, a low-pressure gas pipe 120 in which a low-pressure gaseous refrigerant flows, and a liquid pipe 130 through which liquid refrigerant flows.

The high-pressure gas pipe 110 may include a first high-pressure guide pipe 112 connected to a first heat exchanger 22 and a second high-pressure guide pipe 114 connected to a second heat exchanger 24. In the high-pressure gas pipe 110, a high-pressure branch point 116 branching into the first high-pressure guide pipe 112 and the second high-pressure guide pipe 114 may be formed.

The low pressure gas pipe 120 may include a first low pressure guide pipe 122 connected to the first heat exchanger 22 and a second low pressure guide pipe 124 connected to the second heat exchanger 24. In the low-pressure gas pipe 120, a low-pressure branch point 126 branching into the first low-pressure guide pipe 122 and the second low-pressure guide pipe 124 may be formed.

The first low pressure guide pipe 122 and the first high pressure guide pipe 112 may be joined to a first refrigerant pipe 128 and connected to the first heat exchanger 22, and the second low pressure guide pipe 124 and the second high-pressure guide pipe 114 may be joined to a second refrigerant pipe 129 and connected to the second heat exchanger 24.

The liquid pipe 130 includes a first liquid guide pipe 132 connected to the first heat exchanger 22 and a second liquid guide pipe 134 connected to the second heat exchanger 24. A liquid pipe branch point 136 branching into the first liquid guide pipe 132 and the second liquid guide pipe 134 may be formed in the liquid pipe 130.

Referring to FIG. 2, the plurality of refrigerant valves may change the flow direction of the refrigerant by operating the valve. In addition, the plurality of refrigerant valves may adjust the flow rate of the refrigerant by operating the valve.

The plurality of refrigerant valves may include a high-pressure valve 142a and 142b that is disposed in each of the first high-pressure guide pipe 112 and the second high-pressure guide pipe 114 to open and close the first high-pressure guide pipe 112 and the second high-pressure guide pipe 114, a low-pressure valve 144a and 144b that is disposed in each of the first low-pressure guide pipe 122 and the second low-pressure guide pipe 124 to open and close the first low-pressure guide pipe 122 and the second low-pressure guide pipe 124, and a liquid pipe valve 146a and 146b that is disposed in the first liquid guide pipe 132 and the second liquid guide pipe 134 to adjust the flow rate of the refrigerant flowing through the refrigerant pipe 110, 120, 130.

Referring to FIG. 2, the water pipe may include an inflow pipe 154, 156 for guiding water to flow into the heat exchanger 22, 24 and a discharge pipe 160, 162 for guiding water discharged from the heat exchangers 22, 24.

The inflow pipe 154, 156 may guide water passing through the indoor unit 100, 102, 104, 106 to flow into the heat exchanger 22, 24. The discharge pipe 160, 162 may guide water passing through the heat exchanger 22, 24 to flow to the indoor unit 100, 102, 104, 106.

The inflow pipe 154, 156 may include a first inflow pipe 154, 156 for guiding water to the first heat exchanger 22 and a second inflow pipe 154, 156 for guiding water to the second heat exchanger 24.

The discharge pipe 160, 162 may include a first discharge pipe 160, 162 for guiding water passing through the first heat exchanger 22 to the indoor unit 100, 102, 104, 106 and a second discharge pipe 160, 162 for guiding water passing through the second heat exchanger 24 to the indoor unit 100, 102, 104, 106.

The first inflow pipe 154, 156 may extend to the water inlet of the first heat exchanger 22. The first discharge pipe 160, 162 may extend from the water outlet of the first heat exchanger 22. Likewise, the second inflow pipe 154, 156 may extend to the water inlet of the second heat exchanger 24. The second discharge pipe 160, 162 may extend from the water outlet of the second heat exchanger 24.

Each of the inflow pipe 154, 156 and the discharge pipe 160, 162 may extend to the flow path switching device 30. The water flowed to the water inlet of the heat exchanger 22, 24 from the inflow pipe 154, 156 may exchange heat with the refrigerant, and then flow to the water discharge pipe 160, 162 through the water outlet of the heat exchanger 22, 24.

The water pipe may include a plurality of indoor inflow pipes 170a, 170b, 170c, 170d guiding water to flow into each of the plurality of indoor units 100, 102, 104, 106, and a plurality of indoor discharge pipes 172a, 172b, 172c, 172d guiding water discharged from each of the plurality of indoor units 100, 102, 104, 106.

Each of the plurality of indoor inflow pipes 170a, 170b, 170c, and 170d and the plurality of indoor discharge pipes 172a, 172b, 172c, and 172d is connected to the flow path switching device 30.

The indoor inflow pipe 170a, 170b, 170c, 170d may include a first indoor inflow pipe 170a coupled to the inlet of a first indoor unit 100, a second indoor inflow pipe 170b coupled to the inlet of a second indoor unit 102, a third indoor inflow pipe 170c coupled to the inlet of a third indoor unit 104, and a fourth indoor inflow pipe 170d coupled to the inlet of a fourth indoor unit 106.

Each of the first indoor inflow pipe 170a, the second indoor inflow pipe 170b, the third indoor inflow pipe, and the fourth indoor inflow pipe 170d is connected to the flow path switching device 30.

The indoor discharge pipe 172a, 172b, 172c, and 172d may include a first indoor discharge pipe 172a coupled to the outlet of the first indoor unit 100, a second indoor discharge pipe 172b coupled to the outlet of the second indoor unit 102, a third indoor discharge pipe 172c coupled to the outlet of the third indoor unit 104, and a fourth indoor discharge pipe 172d coupled to the outlet of the fourth indoor unit 106.

Each of the first indoor discharge pipe 172a, the second indoor discharge pipe 172b, the third indoor discharge pipe, and the fourth indoor discharge pipe 172d is connected to the flow path switching device 30.

Referring to FIG. 2, the heat exchanger 22, 24 may be provided so that the refrigerant flow path and the water flow path exchange heat with each other. The heat exchanger 22, 24 may include a plate type heat exchanger capable of exchanging heat between water and the refrigerant. The heat exchanger 22, 24 may be configured such that a flow path through which refrigerant flows and a flow path through which water flows are alternately stacked.

A plurality of heat exchangers 22, 24 may be provided to simultaneously provide cooling and heating to each of the plurality of indoor units 100, 102, 104, and 106. Referring to FIG. 2, the heat exchanger 22, 24 may include a first heat exchanger 22 and a second heat exchanger 24. The first heat exchanger 22 may heat water by exchanging heat with the refrigerant, and the second heat exchanger 24 may cool the water by exchanging heat with the refrigerant.

However, this is just one embodiment, and a structure in which the first heat exchanger 22 cools water and the second heat exchanger 24 heats water, or a structure in which the first heat exchanger 22 and the second heat exchanger 24 alternately cool or heat water may be possible.

Water flowing through the water pipe is selectively flowed into the first heat exchanger 22 or the second heat exchanger 24 according to the operation mode of the indoor unit 100, 102, 104, and 106 to exchange heat with the refrigerant.

Referring to FIG. 2, the pump 26, 28 may provide pressure so that water in inflow pipe 154, 156 is directed to heat exchanger 22, 24. The pump 26, 28 may be installed in the water pipe to set the flow direction of the second fluid.

The pump 26, 28 may include a first pump 26 installed in the first inflow pipe 154, 156 and a second pump 28 installed in the second inflow pipe 154, 156.

The pump 26, 28 may force the flow of water. When the first pump 26 is operated, the water passing through the first heat exchanger 22 may flow to the plurality of indoor units 100, 102, 104, and 106 via the flow path switching device 30. Similarly, when the second pump 28 is operated, the water passing through the second heat exchanger 24 may flow to the plurality of indoor units 100, 102, 104, and 106 via the flow path switching device 30.

<Flow Path Switching Device>

Hereinafter, referring to FIGS. 2 to 12C, the flow path switching device 30 will be described.

Referring to FIG. 2, the flow path switching device 30 sends water flowing through the first heat exchanger 22 or the second heat exchanger 24 to each of the plurality of indoor units 100, 102, 104, 106, and sends water flowing through each of the plurality of indoor units 100, 102, 104, and 106 to the first heat exchanger 22 or the second heat exchanger 24.

The flow path switching device 30 is connected to the first heat exchanger 22 and the second heat exchanger 24 through the inflow pipe 154, 156 and the discharge pipe 160, 162. The flow path switching device 30 is connected to each of a plurality of indoor units 100, 102, 104, and 106 through a plurality of indoor inflow pipes 170a, 170b, 170c, and 170d and a plurality of indoor discharge pipes 172a, 172b, 172c, and 172d.

Figure 3:
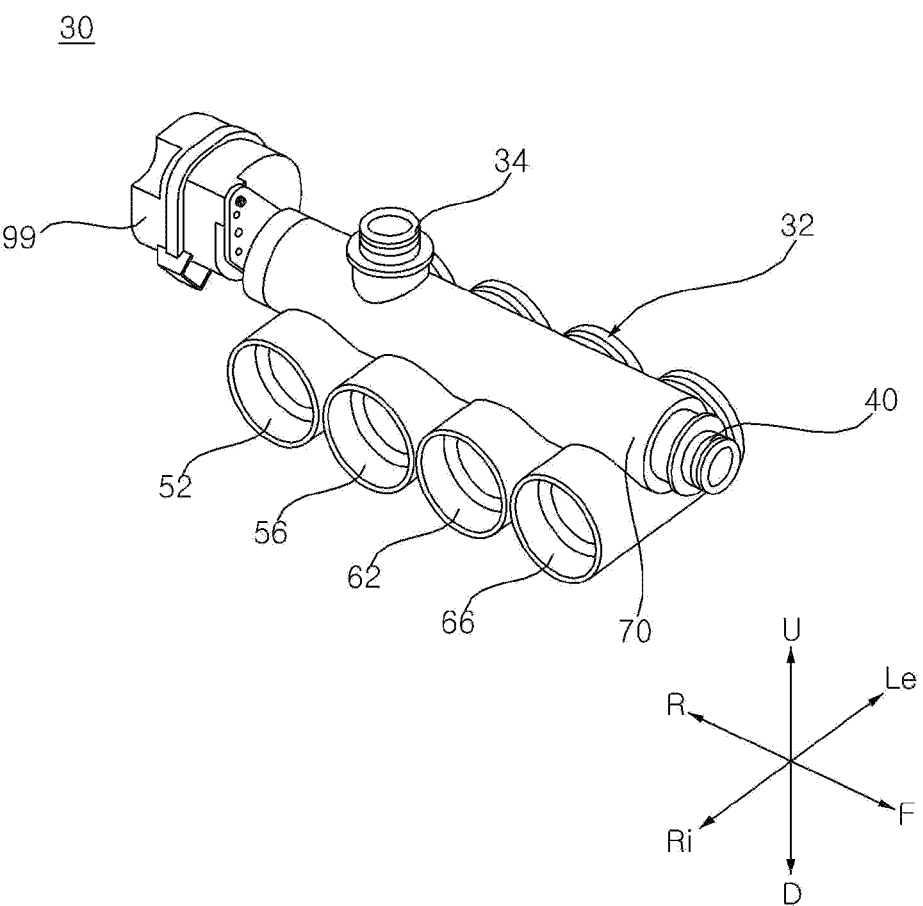
FIG. 3 is a perspective view of a flow path switching device according to an embodiment of the present disclosure.
Figure 4:
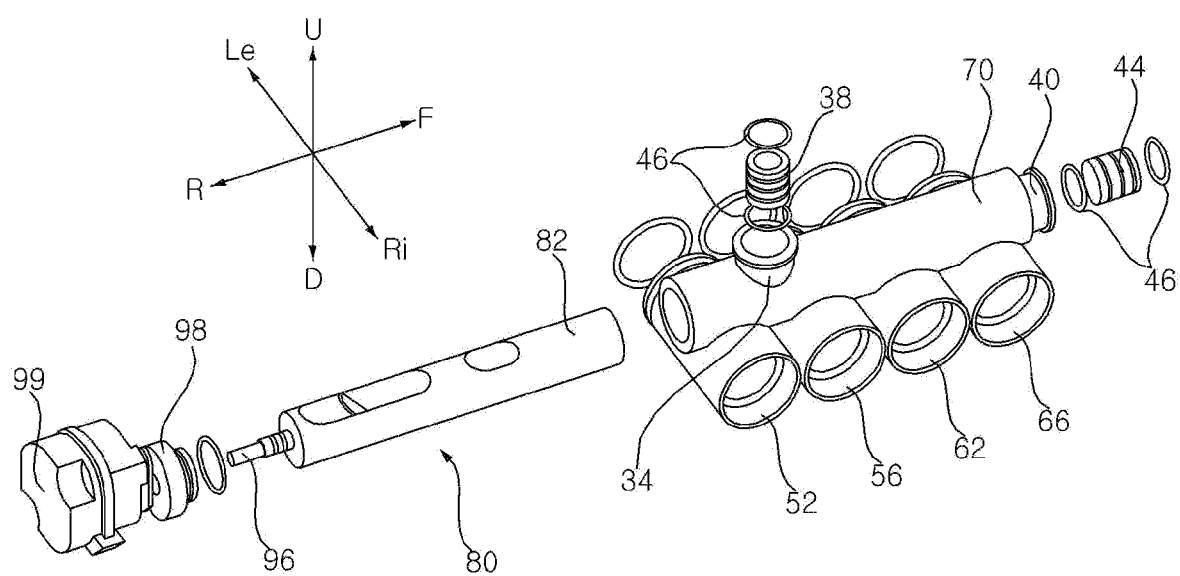
FIG. 4 is an exploded view of FIG. 3.
Figure 5:
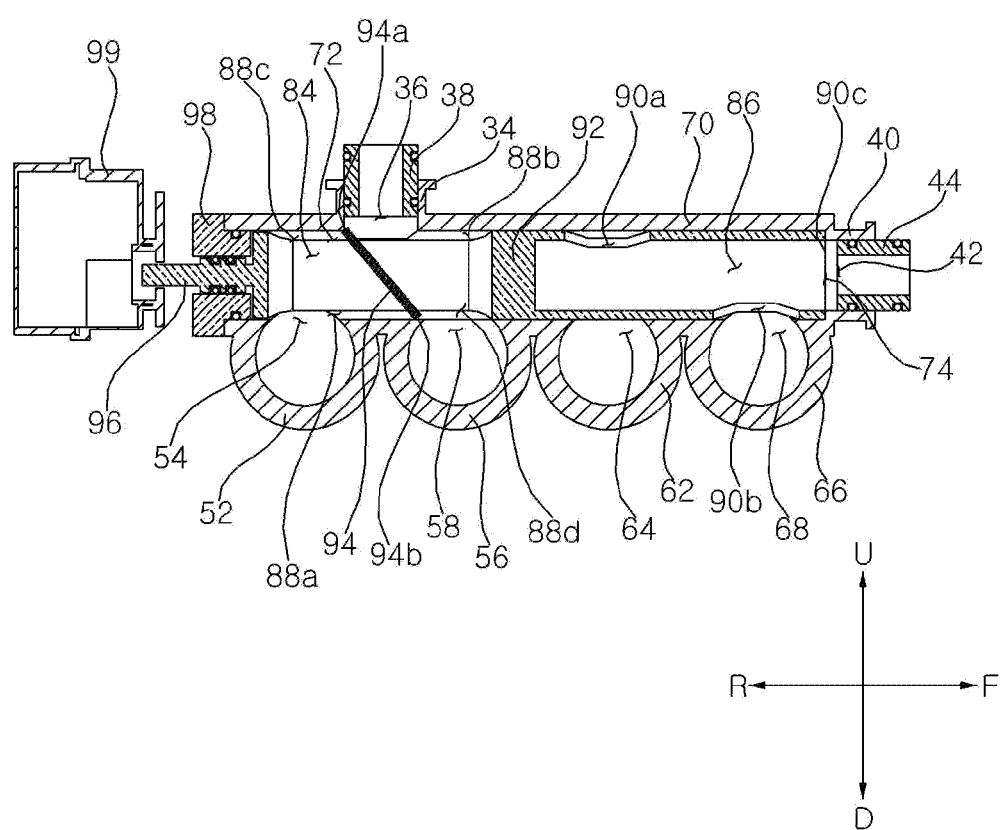
FIG. 5 is a cross-sectional view of FIG. 3.

Referring to FIGS. 3 to 5, the flow path switching device 30 includes a case 32 including a first nozzle 34 into which fluid flows from the indoor unit 100, 102, 104, 106, a second nozzle 40 which sends the fluid to the indoor unit 100, 102, 104, 106, a plurality of inner inflow pipes 62 and 66 through which the fluid heat-exchanged from the heat exchanger 22, 24 flows, a plurality of inner outflow pipes 52, 56 for sending the fluid supplied from the first nozzle 34 to the heat exchanger 22, 24, and a flow path connection portion 70 in which a space 72, 74 is formed to communicate the first nozzle 34 or to communicate the plurality of inner outflow pipes 52 and 56 and the second nozzle 40; a valve 80 that is rotatably disposed in the space 72, 74 of the flow path connection portion 70, connects one pipe among the plurality of inner outflow pipes 52 and 56 to the first nozzle 34 according to the disposition, and connects one of the plurality of inner inflow pipes 62 and 66 to the second nozzle 40; and a motor 99 disposed in one side of the valve 80 to rotate the valve 80.

Referring to FIG. 3, the case 32 includes a plurality of inner outflow pipes 52 and 56 and a plurality of inner inflow pipes 62 and 66. Referring to FIG. 5, each of the plurality of inner outflow pipes 52 and 56 and the plurality of inner inflow pipes 62 and 66 are disposed parallel to a rotation shaft 96 on which the valve 80 rotates.

The plurality of inner outflow pipes 52 and 56 and the plurality of inner inflow pipes 62 and 66 are disposed in the same direction in one side of the flow path connection portion 70, and are disposed spaced apart from each other in a direction in which a rotation shaft around which the valve 80 rotates is formed. The plurality of inner outflow pipes 52 and 56 include a first inner outflow pipe 52 connected to the first heat exchanger 22 and a second inner outflow pipe 56 connected to the second heat exchanger 24. The plurality of inner inflow pipes 62 and 66 include a first inner inflow pipe 62 connected to the first heat exchanger 22 and a second inner inflow pipe 66 connected to the second heat exchanger 24.

The space 72, 74 formed inside the flow path connection portion 70 may be partitioned into a first space 72 communicating the first nozzle 34, and a second space 74 communicating the plurality of inner outflow pipes 52 and 56 and the second nozzle 40.

In each of the first inner outflow pipe 52 and the second inner outflow pipe 56, a first outflow hole 54 and a second outflow hole 58 communicating with the first space 72 of the flow path connection portion 70 is formed. Each of the first outflow hole 54 and the second outflow hole 58 is opened in a direction perpendicular to a pipe direction of the first inner outflow pipe 52 and the second inner outflow pipe 56.

In each of the first inner inflow pipe 62 and the second inner inflow pipe 66, a first inflow hole 64 and a second inflow hole 68 that communicate with the second space 74 of the flow path connection portion 70 are formed. Each of the first inflow hole 64 and the second inflow hole 68 is opened in a direction perpendicular to the pipe direction of each of the first inner inflow pipe 62 and the second inner inflow pipe 66.

The first inner outflow pipe 52 is connected to the first heat exchanger 22 so that water heated in the first heat exchanger 22 may flow. The second inner outflow pipe 56 is connected to the second heat exchanger 24 so that water cooled in the second heat exchanger 24 may flow.

The first inner outflow pipe 52 and the second inner outflow pipe 56 are disposed adjacent to each other, and the first inner inflow pipe 62 and the second inner inflow pipe 66 are disposed adjacent to each other.

Referring to FIG. 5, each of the first inner inflow pipe 62, the second inner outflow pipe 56, the first inner inflow pipe 62, and the second inner inflow pipe 66 is disposed parallel to the rotation shaft 96 on which the valve 80 rotates. Each of the first inner inflow pipe 62, the second inner outflow pipe 56, the first inner inflow pipe 62, and the second inner inflow pipe 66 is disposed parallel to a first direction (F-R) parallel to the rotation shaft 96 of the valve 80.

Referring to FIG. 5, each of the first inflow hole 64, the second inflow hole 68, the first outflow hole 54, and the second outflow hole 58 is formed in the same direction. Each of the first inflow hole 64, the second inflow hole 68, the first outflow hole 54, and the second outflow hole 58 is opened in the second direction (U-D) perpendicular to the first direction (F-R).

The case 32 includes a first nozzle 34 that receives the fluid discharged from the indoor unit 100, 102, 104, 106, and sends it to the first inner outflow pipe 52 or the second inner outflow pipe 56, and a second nozzle 40 that sends the fluid supplied from the first inner inflow pipe 62 or the second inner inflow pipe 66 to the indoor unit 100, 102, 104, 106.

The first nozzle 34 may be connected to the indoor discharge pipe 172a, 172b, 172c, and 172d so that water discharged from the indoor unit 100, 102, 104, and 106 may be supplied. The first nozzle 34 is connected to the first inner outflow pipe 52 or the second inner outflow pipe 56 so that the water discharged from the indoor unit 100, 102, 104, and 106 is sent to the first heat exchanger 22 or sent to the second heat exchanger 24.

Referring to FIG. 5, the first nozzle 34 is disposed in the opposite direction of the first inner outflow pipe 52 and the second inner outflow pipe 56 based on the flow path connection portion 70. The first nozzle 34 extends in a direction perpendicular to the rotation shaft 96 of the valve 80. The first nozzle 34 is disposed between the first inner outflow pipe 52 and the second inner outflow pipe 56, based on the second direction U-D perpendicular to the rotation shaft 96 of the valve 80.

In the first nozzle 34, a first nozzle hole 36 communicating with the first space 72 of the flow path connection portion 70 is formed.

A first connection member 38 connected to the indoor discharge pipe 172a, 172b, 172c, and 172d is disposed in the first nozzle 34. The first connection member 38 is fixedly disposed inside the first nozzle 34 and the indoor discharge pipe 172a, 172b, 172c, and 172d, and may be in close contact with each of the indoor discharge pipe 172a, 172b, 172c, and 172d and the first nozzle 34 by a sealer 46.

The second nozzle 40 may send water supplied through the first inner inflow pipe 62 or the second inner inflow pipe 66 to the indoor unit 100, 102, 104, and 106. The second nozzle 40 is connected to the indoor inflow pipe 170a, 170b, 170c, and 170d, and supplies water supplied from the first heat exchanger 22 or the second heat exchanger 24 to the indoor unit 100, 102, 104, 106.

Referring to FIG. 5, the second nozzle 40 is disposed in a distal end of the flow path connection portion 70. The second nozzle 40 extends in a direction parallel to the rotation shaft 96 of the valve 80. The second nozzle 40 is disposed in the opposite direction to the motor 99. The second nozzle 40 extends in the opposite direction to the motor 99 in the first direction F-R.

In the second nozzle 40, a second nozzle hole 42 communicating with the second space 74 of the flow path connection portion 70 is formed.

A second connection member 44 connected to the indoor inflow pipe 170a, 170b, 170c, and 170d is disposed in the second nozzle 40. The second connection member 44 is fixedly disposed inside the second nozzle 40 and the indoor inflow pipe 170a, 170b, 170c, 170d, and may be in close contact with each of the indoor inflow pipe 170a, 170b, 170c, 170d and the second nozzle 40 by the sealer 46.

Referring to FIG. 5, the flow path connection portion 70 forms a first space 72 connecting the first nozzle 34 and the first inner outflow pipe 52 or the second inner outflow pipe 56. The flow path connection portion 70 forms a second space 74 connecting the second nozzle 40 and the first inner inflow pipe 62 or the second inner inflow pipe 66.

The first space 72 and the second space 74 formed inside the flow path connection portion 70 are disposed in a direction parallel to the rotation shaft 96 of the valve 80 and communicate with each other. The first space 72 may communicate with each of the first inner outflow pipe 52 and the second inner outflow pipe 56 through the first outflow hole 54 and the second outflow hole 58. The second space 74 may communicate with each of the first inner inflow pipe 62 and the second inner inflow pipe 66 through the first inflow hole 64 and the second inflow hole 68.

Referring to FIGS. 4 and 5, the valve 80 includes a valve body 82 that forms an outer shape, and forms a first chamber 84 connecting one of the plurality of inner outflow pipes 52 and 56 and the first nozzle 34 and a second chamber 86 connecting one of the plurality of inner inflow pipes and the second nozzle 40 therein, and a partition plate 92 that is disposed inside the valve body 82 and partitions the first chamber 84 and the second chamber 86. The valve 80 includes a guide plate 94 that forms an inclined surface to guide water flowing from the first nozzle 34 to the first inner outflow pipe 52 or the second inner outflow pipe 56.

The valve body 82 has a cylindrical shape, and the first chamber 84 and the second chamber 86 are formed therein. Inside the valve body 82, the partition plate 92 partitioning the first chamber 84 and the second chamber 86 is disposed. A guide plate 94 is disposed in the first chamber 84 formed inside the valve body 82.

Referring to FIG. 5, the valve body 82 has a plurality of first chamber holes 88a, 88b, 88c, 88d connecting the first inner outflow pipe 52 or the second inner outflow pipe 56 and the first nozzle 34. The plurality of first chamber holes may include a first upper hole 88a that communicates with the first nozzle hole 36 or communicates with the first inner outflow pipe 52 according to the disposition, and a second upper hole 88b that communicates with the first nozzle hole 36 or communicates with the second inner outflow pipe 56 according to the disposition.

The plurality of first chamber holes includes a first lower hole 88c that does not communicate with the first nozzle hole 36 even if the disposition is changed, and communicates with the first inner outflow pipe 52, and a second lower hole 88d that does not communicate with the second nozzle hole 42 even if the disposition is changed, and communicates with the second inner outflow pipe 56. The first upper hole 88a and the first lower hole 88c are disposed to face each other. The second upper hole 88b and the second lower hole 88d face each other. The first upper hole 88a and the second lower hole 88d are disposed parallel to the rotation shaft 96 of the valve 80. The second upper hole 88b and the first lower hole 88c are disposed parallel to the rotation shaft 96 of the valve 80.

When the first upper hole 88a is disposed in communication with the first nozzle hole 36, the water flowing through the first nozzle 34 flows into the first inner outflow pipe 52, and when the second upper hole 88b is disposed in communication with the first nozzle hole 36, water flowing through the second nozzle 40 flows into the second inner outflow pipe 56.

Figure 7A:
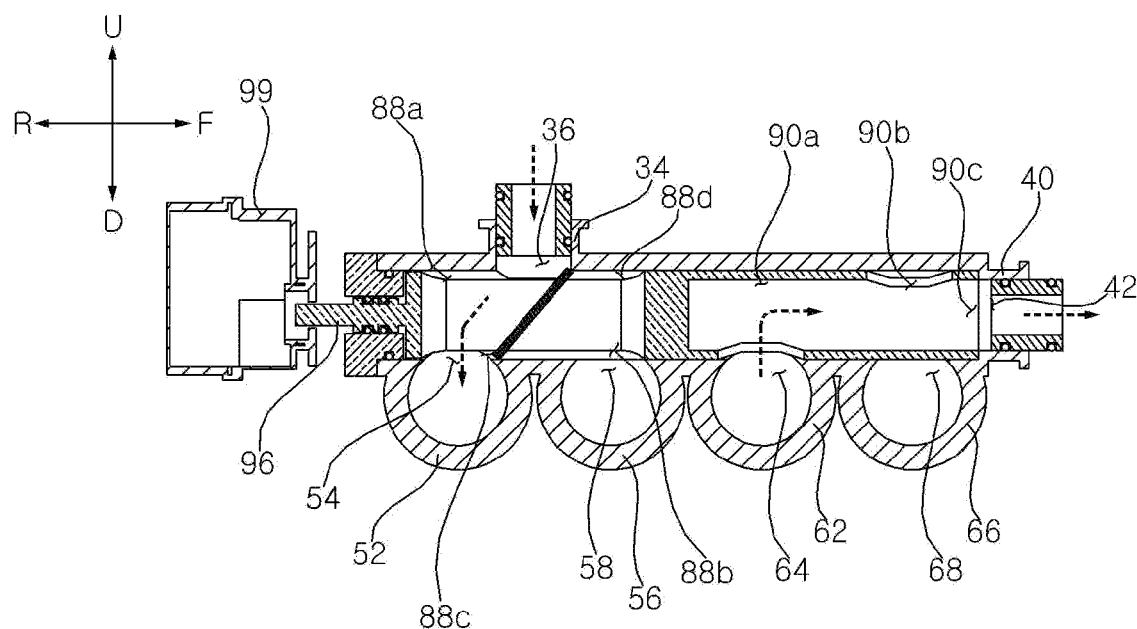
FIGS. 7A to 7C are views for explaining the flow of water flowing through the flow path switching device according to an embodiment of the present disclosure.
Figure 7B:
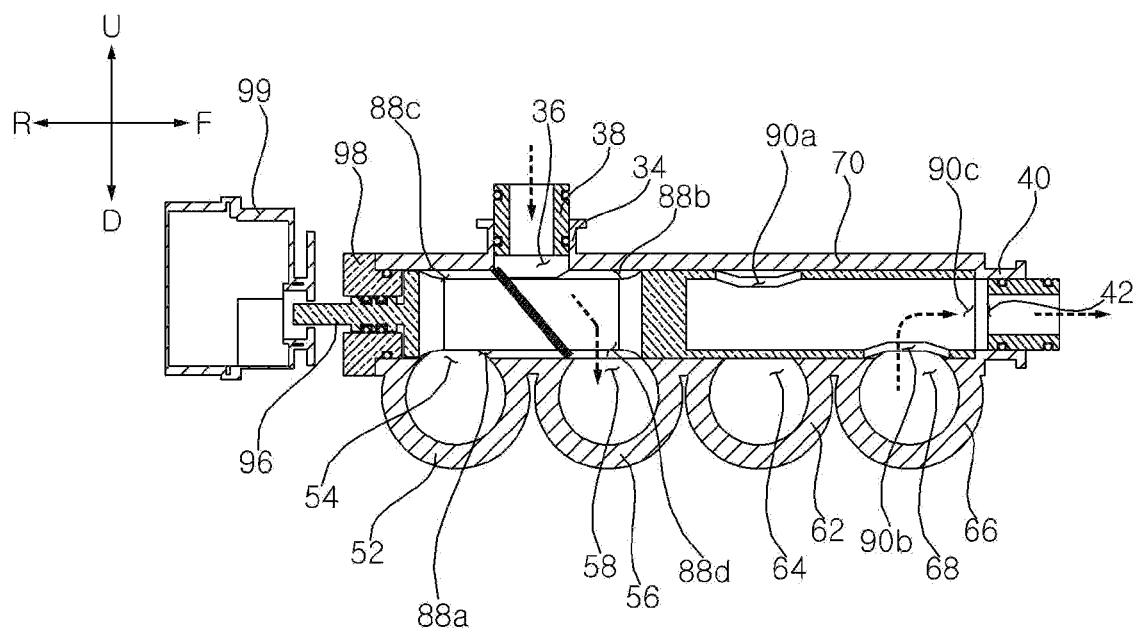

Referring to FIG. 7B, when the first upper hole 88a is disposed in communication with the first inner outflow pipe 52, water is not supplied to the first inner outflow pipe 52. Similarly, referring to FIG. 7A, when the second upper hole 88b is disposed in communication with the second inner outflow pipe 56, water is not supplied to the second inner outflow pipe 56.

The guide plate 94 may be disposed in the first chamber 84 to send water flowing from the first nozzle 34 to the first inner outflow pipe 52 or the second inner outflow pipe 56.

Referring to FIG. 7A or 7B, the guide plate 94 is disposed below the first nozzle 34. The guide plate 94 may have one end disposed in one end portion of the first nozzle adjacent to the first inner inflow pipe, or the other end disposed in the other end portion of the first nozzle adjacent to the second inner inflow pipe.

A first upper hole 88a and a second lower hole 88d may be formed in the opposite direction based on one end 94a of the guide plate 94. A second upper hole 88b and a first lower hole 88c may be formed in the opposite direction based on the other end 94b of the guide plate 94.

Referring to FIG. 5, the valve body 82 has a plurality of second chamber holes 90a, 90b, 90c connecting the first inner inflow pipe 62 or the second inner inflow pipe 66 and the second nozzle 40. The plurality of second chamber holes 90a, 90b, and 90c includes a first valve hole 90a communicating with the first inflow hole 64 according to the disposition, a second valve hole 90b communicating with the second inflow hole 68 according to the disposition, and a third valve hole 90c communicating with the second nozzle hole 42.

The first valve hole 90a and the second valve hole 90b are disposed with a phase difference of 180 degrees from each other, in a position corresponding to the first inner inflow pipe 62 and the second inner inflow pipe 66. Accordingly, the second chamber 86 may communicate with the first inner inflow pipe 62 or the second inner inflow pipe 66 according to the disposition of the valve body 82.

The valve 80 further includes a rotation shaft 96 that extends from a distal end of the valve body 82 in a direction in which the motor 99 is disposed, and is connected to the motor 99 to rotate the valve body 82.

The motor 99 may be disposed in one side of the valve 80, be connected to the valve 80 by the rotation shaft 96, and rotate the valve 80.

Referring to FIG. 5, the flow path switching device 30 may further include a valve fixing member 98 for fixing the disposition of the rotating valve 80 inside the flow path connection portion 70 of the case 32. The valve fixing member 98 may prevent movement of the valve 80 rotating inside the flow path connection portion 70. The valve fixing member 98 may be disposed around the rotation shaft 96 of the valve 80. The valve fixing member 98 may be disposed between the rotation shaft 96 of the valve 80 and the case 32.

Figure 6:
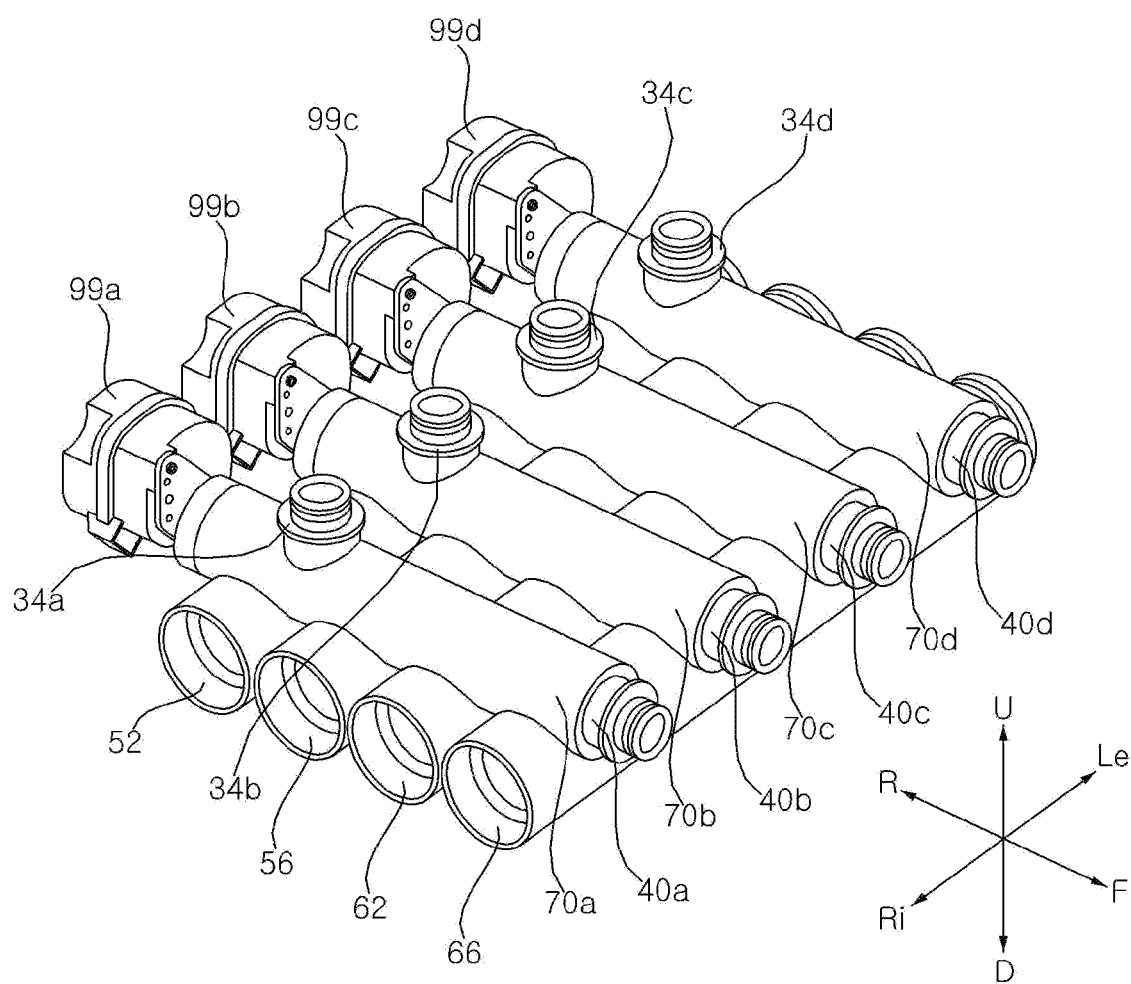
FIG. 6 is a perspective view of a flow path switching device in which a plurality of flow path connection units, a valve, and a motor are disposed.

Referring to FIG. 6, the case 32 includes a plurality of flow path connection portions 70a, 70b, 70c, and 70d. In each of the plurality of flow path connection portions 70a, 70b, 70c, and 70d, the first nozzle 34a, 34b, 34c, 34d through which water flowed from the indoor unit 100, 102, 104, 106 flows, and the second nozzle 40a, 40b, 40c, 40d through which water supplied to the indoor unit 100, 102, 104, 106 flows are disposed.

Referring to FIG. 6, the flow path switching device 30 includes a plurality of valves 80a, 80b, 80c, and 80d disposed inside each of the plurality of flow path connection portions 70a, 70b, 70c, and 70d, and a plurality of motors 99a, 99b, 99c, 99d connected to each of the plurality of valves 80a, 80b, 80c, 80d.

Each of the plurality of flow path connection portions 70a, 70b, 70c, and 70d is connected to each of the plurality of indoor units 100, 102, 104, and 106. Referring to FIG. 6, the plurality of flow path connection portions 70a, 70b, 70c, and 70d are spaced apart from each other in the direction in which the plurality of inner inflow pipes 62 and 66 and the plurality of inner outflow pipes 52 and 56 extend. The plurality of flow path connection portions 70a, 70b, 70c, and 70d are spaced apart from each other in a third direction (Ri-Le) perpendicular to the first direction (F-R).

Figure 8:
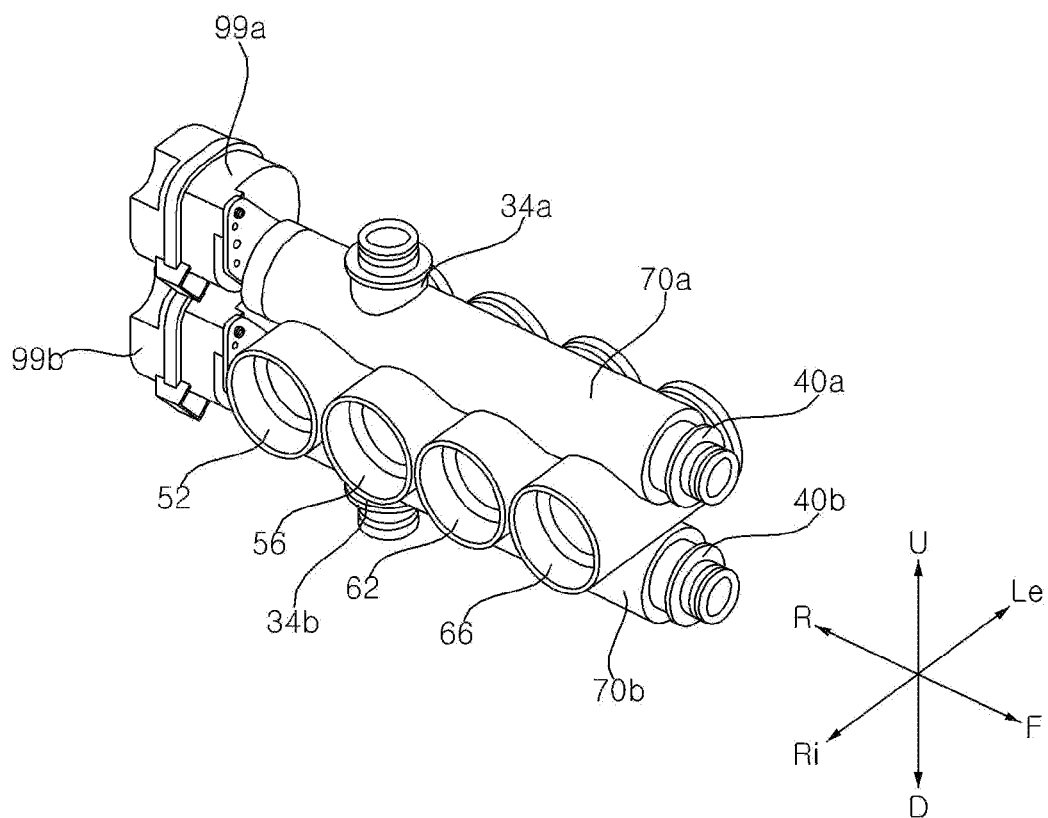
FIG. 8 is a perspective view of a flow path switching device including two flow path connection units, a motor, and a valve according to an embodiment of the present disclosure.

Referring to FIG. 8, the plurality of flow path connection portions 70a, 70b, 70c, and 70d may be disposed in the up-down direction of the plurality of inner inflow pipes 62 and 66 and the plurality of inner outflow pipes 52 and 56. That is, the flow path connection portion 70 may be disposed in the up-down direction of the plurality of inner inflow pipes 62 and 66 and the plurality of inner outflow pipes 52 and 56, in the second direction (U-D) perpendicular to the first direction.

Figure 9:
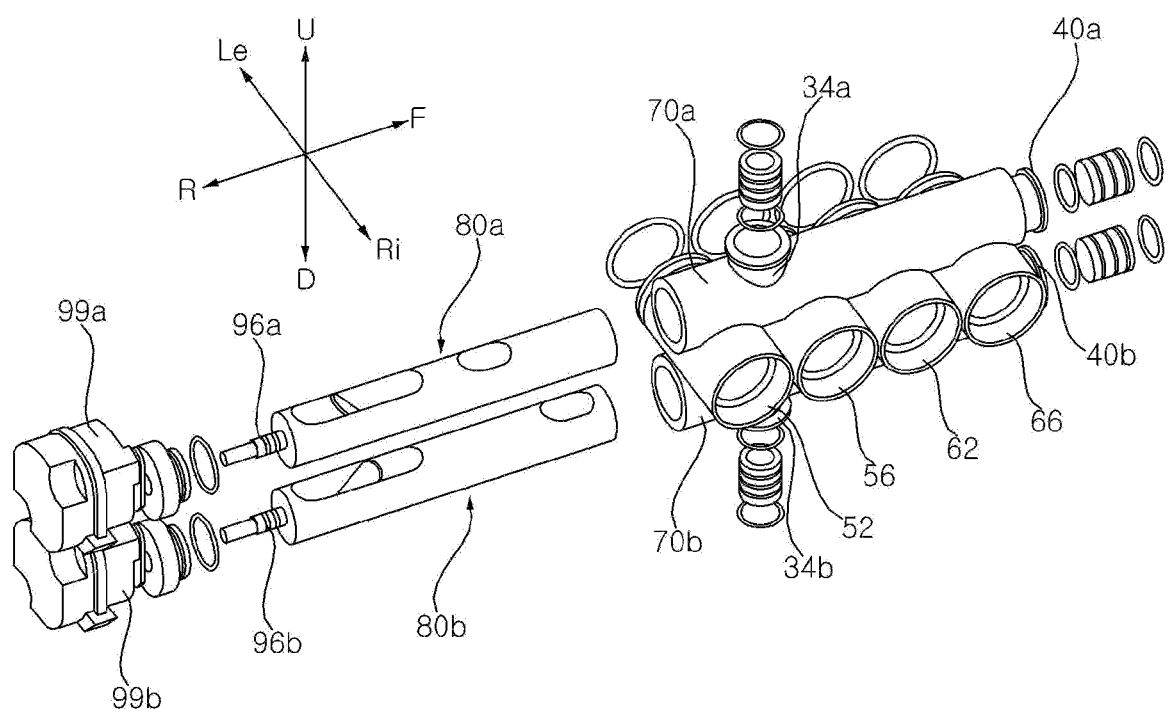
FIG. 9 is an exploded view of FIG. 8.
Figure 10:
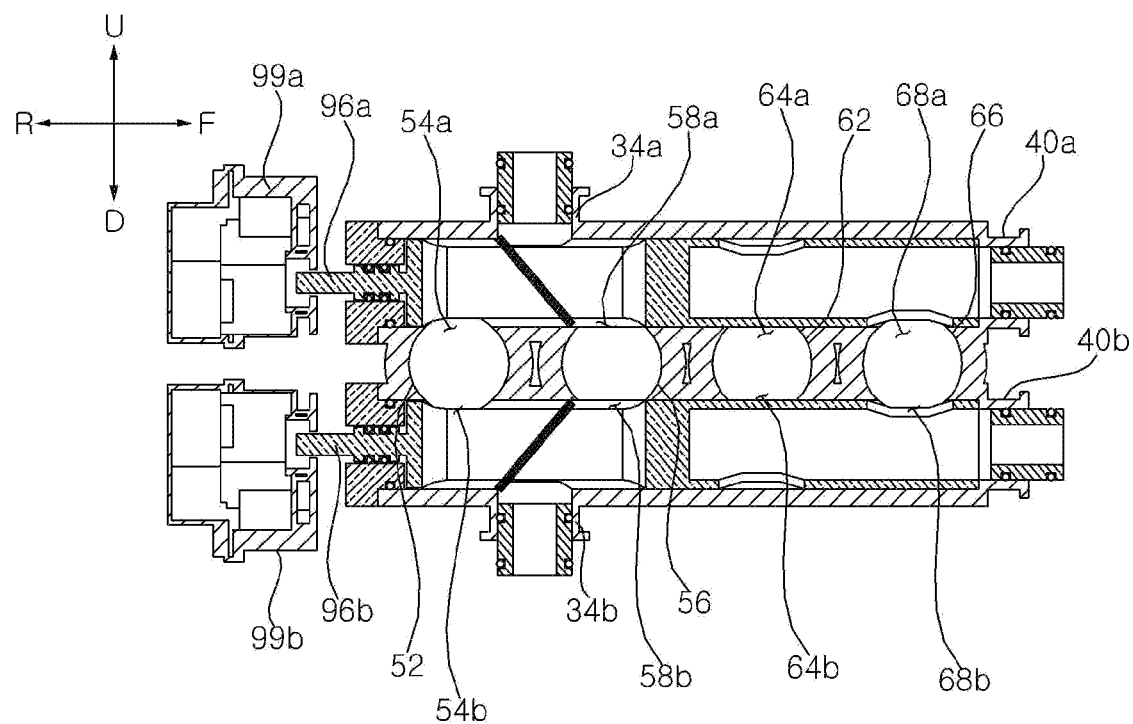
FIG. 10 is a cross-sectional view of FIG. 8.

Referring to FIGS. 8 to 10, the case 32 includes a first upper nozzle 34a into which fluid flows from one of the plurality of indoor units 100, 102, 104, 106, a second upper nozzle 40a for sending fluid to one of the plurality of indoor units 100, 102, 104, 106, a first lower nozzle 34b into which fluid flows another indoor unit among the plurality of indoor units 100, 102, 104, 106, a second lower nozzle 40b for sending fluid to another indoor unit among the plurality of indoor units, a plurality of inner outflow pipes 52 and 56 through which the fluid supplied from the first upper nozzle 34a or the first lower nozzle 34b flows, a plurality of inner inflow pipes 62 and 66 for supplying fluid to the second upper nozzle 40a or the second lower nozzle 40b, a first flow path connection portion 70a having an upper space for communicating the plurality of inner outflow pipes 52 and 56 with the first upper nozzle or communicating the plurality of inner inflow pipes 62 and 66 with the second upper nozzle, and a second flow path connection portion 70a having a lower space for communicating the plurality of inner inflow pipes 52 and 56 with the first lower nozzle 34b or communicating the plurality of inner inflow pipes 62 and 66 with the second lower nozzle 40b.

Referring to FIG. 10, the first flow path connection portion 70a and the second flow path connection portion 70b are disposed in the up-down direction based on the plurality of inner outflow pipes 52 and 56 and the plurality of inner inflow pipes 62 and 66.

The plurality of inner outflow pipes 52 and 56 and the plurality of inner inflow pipes 62 and 66 may be disposed between the first flow path connection portion 70a and the second flow path connection portion 70b, and may be spaced apart from each other in a direction in which a first rotation shaft around which the first valve 80a rotates or a second rotation shaft around which the second valve 80b rotates is formed. The first upper nozzle 34a and the first lower nozzle 34b may have a shape protruding from the case 32 in different directions. The second upper nozzle 40a and the second lower nozzle 40b are disposed in the up-down direction based on the plurality of inner outflow pipes 52 and 56 and the plurality of inner inflow pipes 62 and 66, and protrude in the same direction.

The plurality of inner outflow pipes 52 and 56 include a first inner outflow pipe 52 connected to the first heat exchanger 22 and a second inner outflow pipe 56 connected to the second heat exchanger 24. The plurality of inner inflow pipes 62 and 66 include a first inner inflow pipe 62 connected to the first heat exchanger 22 and a second inner inflow pipe 66 connected to the second heat exchanger 24.

The upper space formed inside the first flow path connection portion 70a may be partitioned into a first upper space communicating the plurality of inner outflow pipes 52, 56 with the first upper nozzle, and a second upper space communicating the plurality of inner inflow pipes 62 and 66 with the second upper nozzle.

The lower space formed inside the second flow path connection portion 70b may be partitioned into a first lower space communicating the plurality of inner outflow pipes 52 and 56 and the first lower nozzle 34b, and a second lower space communicating the plurality of inner inflow pipes 62 and 66 with the second lower nozzle 40b.

Referring to FIG. 10, in each of the first inner outflow pipe 52 and the second inner outflow pipe 56, a first upper outflow hole 54a and a second upper outflow holes 58a that communicate with the first upper space of the first flow path connection portion 70a, and a first lower outflow hole 54b and a second lower outflow hole 58b that communicate with the first lower space of the second flow path connection portion 70b are formed.

Referring to FIG. 10, in each of the first inner inflow pipe 62 and the second inner inflow pipe 66, a first upper inflow hole 64a and a second upper inflow hole 68a that communicate with the second upper space of the first flow path connection portion 70a, and a first lower inflow hole 64b and a second lower inflow hole 68b that communicate with the second lower space of the second flow path connection portion 70b are formed.

Referring to FIG. 9, the flow path switching device 30 includes a first valve 80a that is rotatably disposed in the first upper space and the second upper space of the first flow path connection portion 70a, connects one of the plurality of inner outflow pipes 52 and 56 to the first upper nozzle according to the disposition, and connects one of the plurality of inner inflow pipes 62 and 66 and the second upper nozzle 40a, and a second valve 80b that is rotatably disposed in the first lower space and the second lower space of the second flow path connection portion 70b, connects one of the plurality of inner outflow pipes 52 and 56 to the first lower nozzle 34b according to the disposition, and connects one of the plurality of inner inflow pipes 62 and 66 and the second lower nozzle 40b.

Referring to FIGS. 9 to 10, the flow path switching device 30 includes a first motor 99a that is disposed in one side of the first valve 80a and rotates the first valve 80a, and a second motor 99b that is disposed in one side of the second valve 80b and rotates the second valve 80b.

Referring to FIG. 10, the case 32 may include a plurality of first flow path connection portions 70a and a plurality of second flow path connection portions 70b. The plurality of first flow path connection portions 70a may be spaced apart from each other in a direction in which the plurality of inner inflow pipes 62, 66 and the plurality of inner outflow pipes 52, 56 are extended, in the upper side of the plurality of inner outflow pipes 52, 56 and the plurality of inner inflow pipes 62, 66. Similarly, the plurality of second flow path connection portions 70b may be spaced apart from each other in a direction in which the plurality of inner inflow pipes 62, 66 and the plurality of inner outflow pipes 52, 56 are extended, in the lower side of the plurality of inner outflow pipes 52, 56 and the plurality of inner inflow pipes 62, 66.

Figure 11:
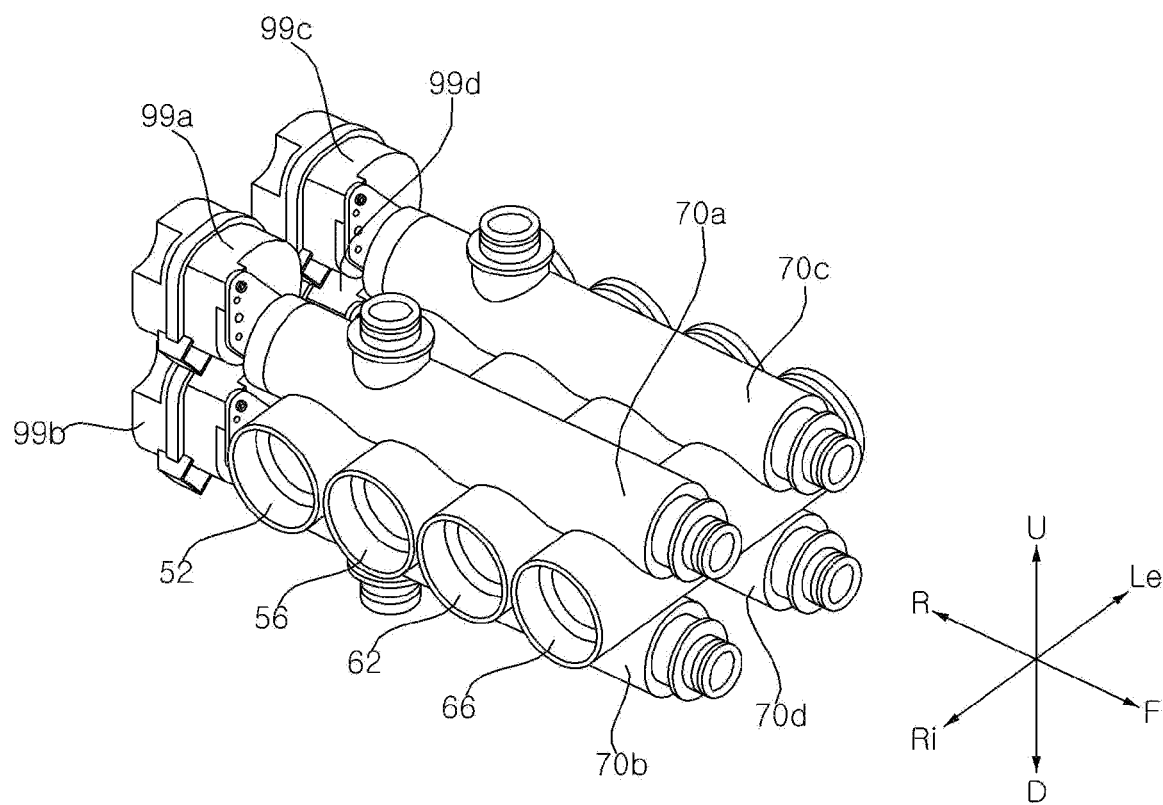
FIG. 11 is a perspective view of a flow path switching device including additional flow path connection unit, motor, and valve in the flow path switching device of FIG. 8.

Referring to FIG. 11, the case 32 may include a plurality of flow path connection portions 70*a*, 70*b*, 70*c*, and 70*d*. The plurality of flow path connection portions 70*a*, 70*b*, 70*c*, and 70*d* may be disposed in the up-down direction of the plurality of inner outflow pipes 52, 56 and the plurality of inner inflow pipes 62, 66 and may be spaced apart from each other in a direction in which the plurality of inner outflow pipes 52, 56 and the plurality of inner inflow pipes 62 and 66 are extended.

In the flow path switching device according to the present embodiment, a plurality of flow path connection portions 70*a*, 70*b*, 70*c*, and 70*d* may be disposed as shown in FIG. 6 or as shown in FIG. 11. Since this can be variously transformed according to the space inside the relay device, it has a high utilization of space and can be applied even in a narrow space.

<Operation>

Hereinafter, the flow of fluid according to the operation of the flow path switching device 30 will be described with reference to FIGS. 7A to 7C.

A plurality of valves are disposed in the case 32, and each of the plurality of valves is connected to each of a plurality of indoor units. The plurality of indoor units may be operated for cooling or heating according to conditions of an indoor space or a user's determination. Accordingly, each of the plurality of valves may be operated in different directions.

Referring to FIG. 7A, the valve 80 may connect the first nozzle 34 and the first inner outflow pipe 52, and connect the second nozzle 40 and the first inner inflow pipe 62, so that one indoor unit and the first heat exchanger 22 may be connected. At this time, when the first heat exchanger 22 supplies heated water through the refrigerant, the heated water can be supplied to the indoor unit 100, 102, 104, 106.

Referring to FIG. 7B, the valve 80 may connect the first nozzle 34 and the second inner inflow pipe 56, and connect the second nozzle 40 and the second inner inflow pipe 66, so that one indoor unit and the second heat exchanger 24 may be connected.

At this time, when the second heat exchanger 24 supplies cooled water through the refrigerant, the cooled water may be supplied to the indoor unit 100, 102, 104, 106.

Figure 7C:
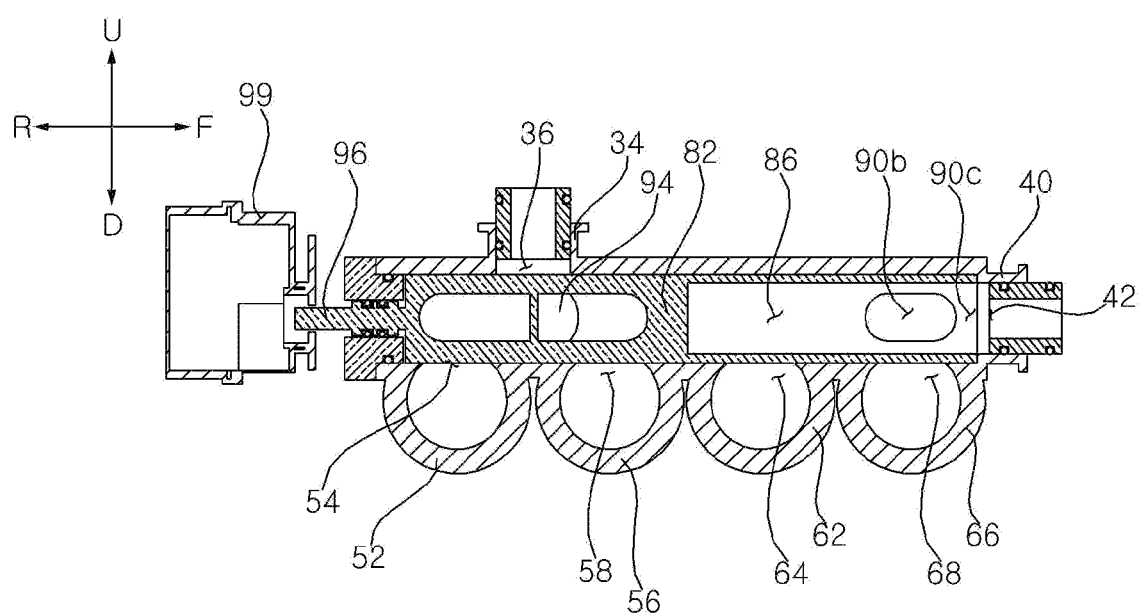

Referring to FIG. 7C, the valve 80 may close the first nozzle 34 and the second nozzle 40. When a corresponding indoor unit is not separately operated, the inside of the flow path connection portion is closed through the valve 80 to prevent heat-exchanged water from flowing into an indoor unit that does not require heat exchange.

Figure 12A:
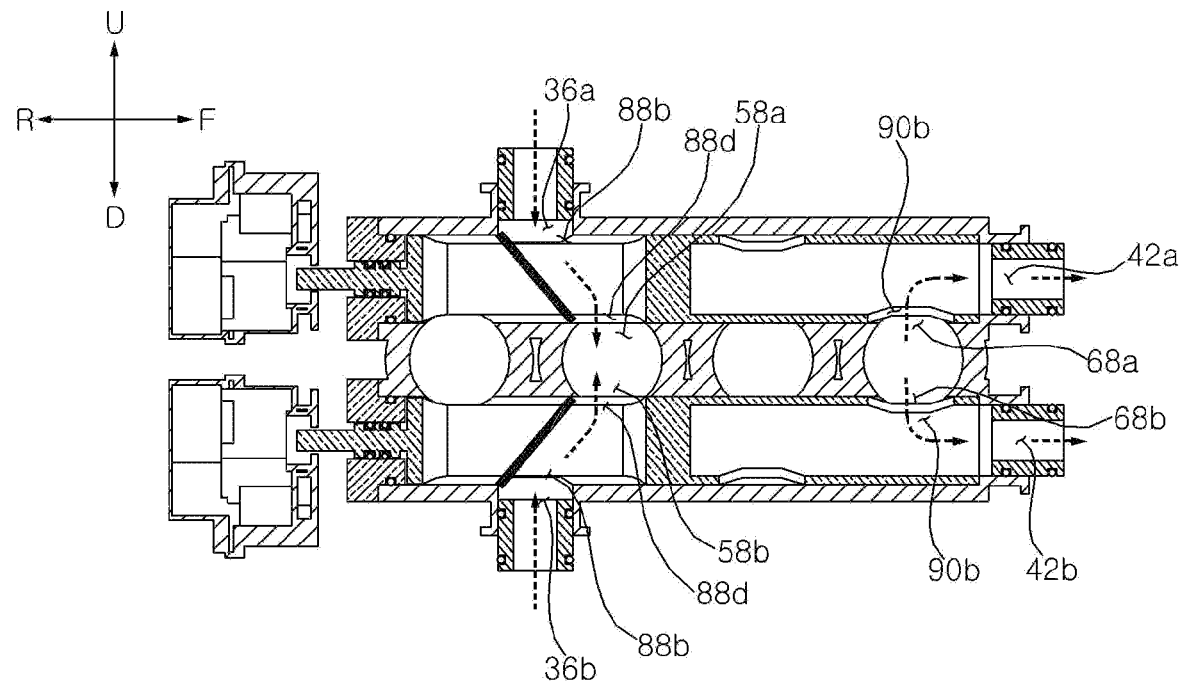
FIGS. 12A to 12C are views for explaining the flow of water flowing according to a disposition of a valve disposed in the upper side of the flow path switching device of FIG. 8.
Figure 12B:
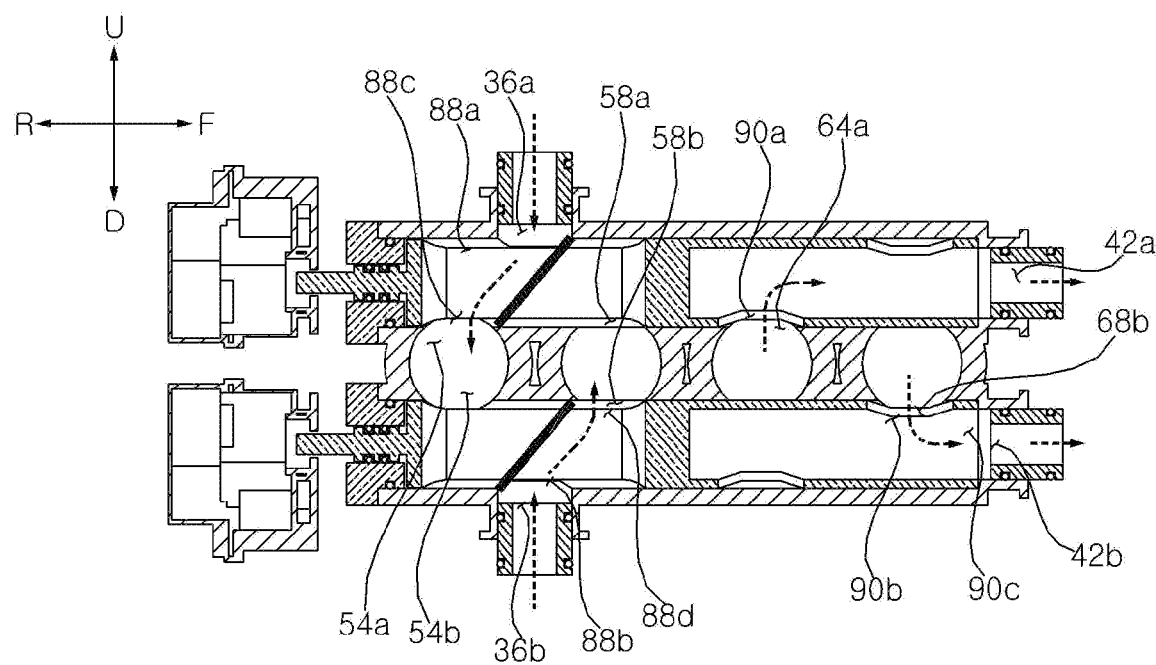
Figure 12C:
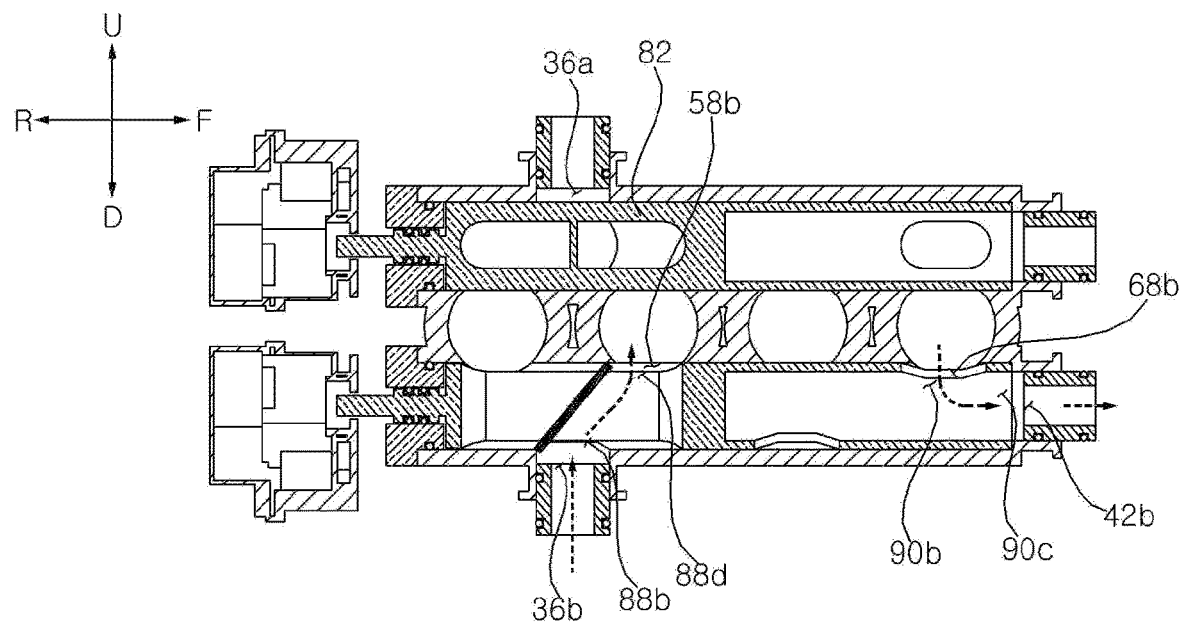

The disposition of valve in FIGS. 7A to 7C may be identically applied to the flow path switching device of FIG. 8. Referring to FIGS. 12A to 12C, the disposition of the first valve 80*a* disposed above the plurality of inner outflow pipes 52 and 56 and the plurality of inner inflow pipes 62 and 66 is changed. However, this is according to the embodiment, the second valve 80*a* disposed below the plurality of inner outflow pipes 52 and 56 and the plurality of inner inflow pipes 62 and 66 may also operate individually.

Referring to FIG. 12A, the first valve 80*a* connects the first upper nozzle 34*a* and the first inner inflow pipe 52, and connects the second upper nozzle 40*a* and the first inner inflow pipe 62, thereby connecting one indoor unit and the first heat exchanger 22. In addition, referring to FIG. 12B, the first valve 80*a* connects the first upper nozzle 34*a* and the second inner outflow pipe 56, and connects the second upper nozzle 40*a* and the second inner inflow pipe 66, thereby connecting one indoor unit and the second heat exchanger 24. In addition, referring to FIG. 12C, the first valve 80*a* may close the first upper nozzle 34*a* and the second upper nozzle 40*a*.

Figure 13A:
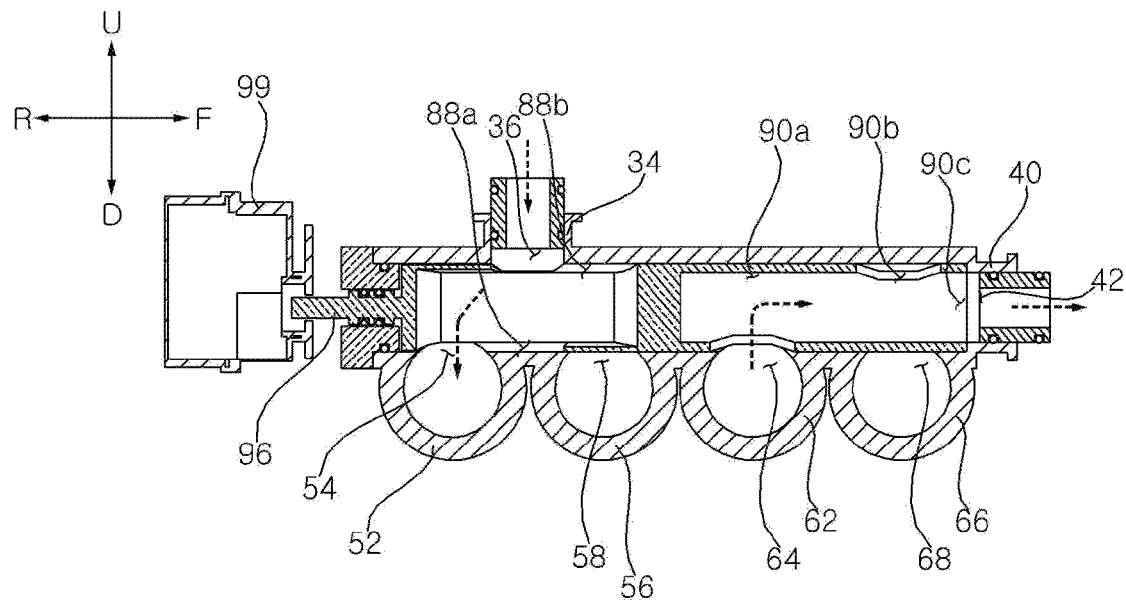
FIGS. 13A to 13B are views for explaining the flow of water flowing through a flow path switching device including a valve according to another embodiment of the present disclosure.
Figure 13B:
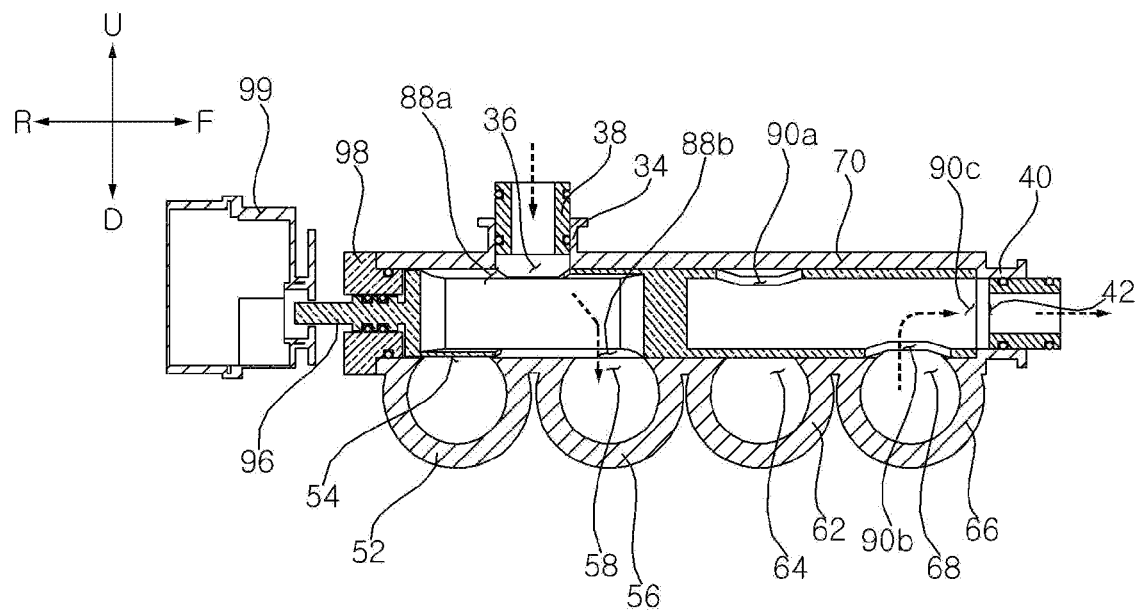

FIGS. 13A and 13B are views for explaining a valve 80 according to another embodiment of the present disclosure. The valve 80 explained in FIGS. 13A and 13B can also be applied to the flow path switching device of FIGS. 3 to 7C, and other configurations excluding the valve 80 can be understood in the same way.

The valve 80 may include a valve body 82 that forms an external shape, and forms a first chamber 84 connecting one of the plurality of inner outflow pipes 52, 56 and the first nozzle 34 and a second chamber 86 connecting one of the plurality of inner inflow pipes and the second nozzle 40 therein, and a partition plate 92 that is disposed inside the valve body 82 and partitions the first chamber 84 and the second chamber 86.

The valve body 82 has a cylindrical shape, and the first chamber 84 and the second chamber 86 are formed therein. Inside the valve body 82, the partition plate 92 partitioning the first chamber 84 and the second chamber 86 is disposed.

A plurality of first chamber holes 88*a* and 88*b* connecting the first inner outflow pipe 52 or the second inner outflow pipe 56 and the first nozzle 34 are formed in the valve body 82. The plurality of first chamber holes 88*a* and 88*b* may include a first hole 88*a* that communicates with the first nozzle hole 36 or communicates with the first inner outflow pipe 52 according to the disposition, and a second hole 88*b* that communicates with the first nozzle hole 36 or the second inner outflow pipe 56 according to the disposition.

The first hole 88*a* is formed from an area where the first inner outflow pipe 52 is disposed to an area where the first nozzle 34 is disposed. The second hole 88*b* is formed from an area where the first nozzle 34 is disposed to an area where the second inner outflow pipe 56 is disposed.

The first hole 88*a* and the second hole 88*b* are disposed in opposite directions and overlap each other at a portion where the first nozzle hole 36 is formed. Therefore, each of the first hole 88*a* and the second hole 88*b* may communicate with the first nozzle hole 36 formed in the first nozzle 34, when the first hole 88*a* and the second hole 88*b* are disposed in the direction in which the first nozzle 34 is disposed. When one hole of the first hole 88*a* and the second hole 88*b* is disposed to communicate with the first nozzle hole 36, the other hole is disposed to communicate with the inner outflow pipe.

When disposed as shown in FIG. 13A, the first hole 88*a* communicates with the first upper outflow hole 54*a* formed in the first inner outflow pipe 52, and the second hole 88*b* communicates with the first nozzle hole 36 formed in the first nozzle 34.

In addition, as shown in FIG. 13B, when the first hole 88*a* communicates with the first nozzle hole 36 formed in the first nozzle 34, the second hole 88*b* communicates with the second upper outflow hole 58*a* formed in the second inner outflow pipe 56, and the second hole 88*b* communicates with the first nozzle hole 36 formed in the first nozzle 34.

Figure 14A:
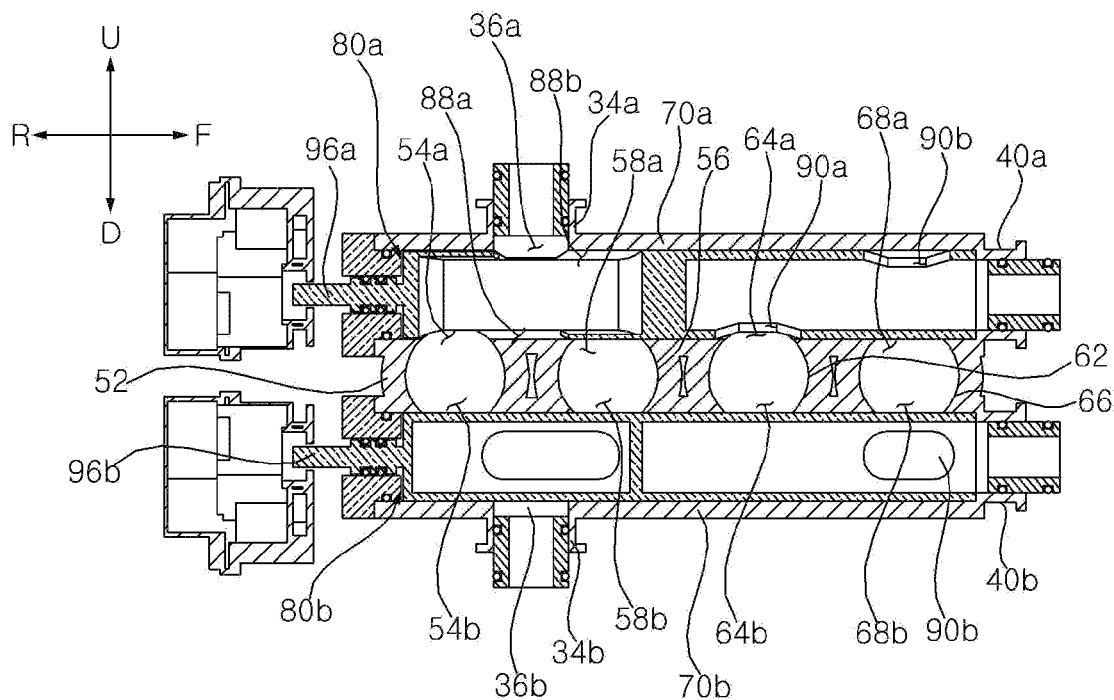
FIGS. 14A to 14B are views for explaining the flow of water flowing through a flow path switching device including two valves according to another embodiment of the present disclosure.
Figure 14B:
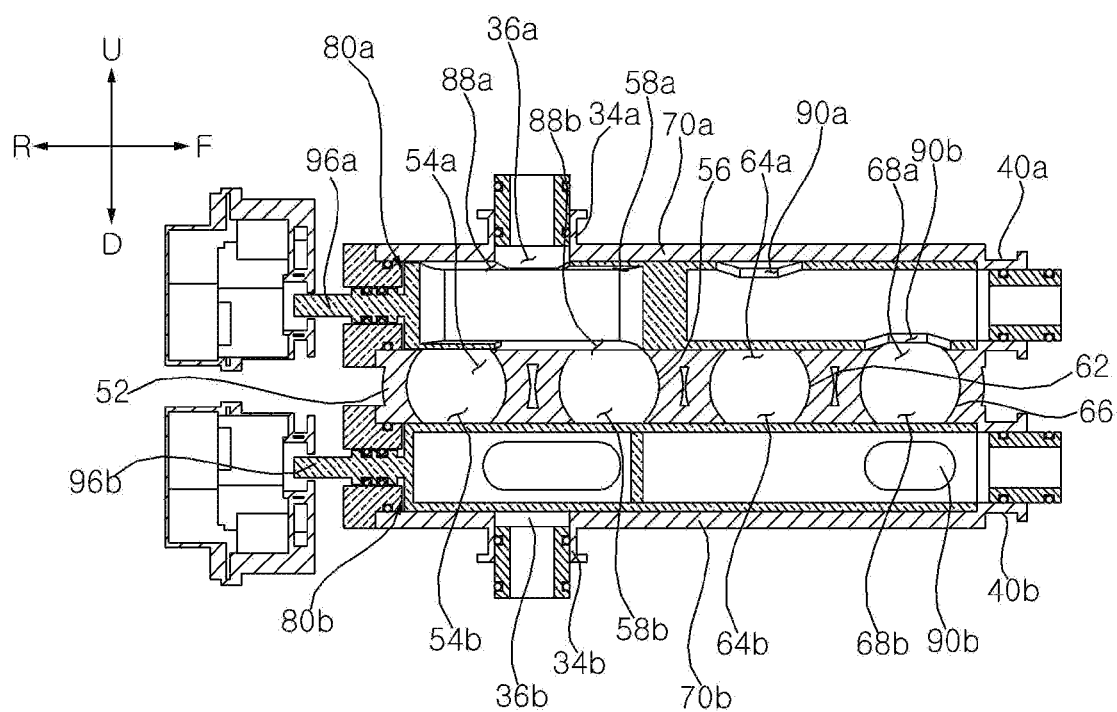

FIGS. 14A and 14B show that the valve configuration used in FIGS. 13A and 13B is disposed in each of the flow path connection portions disposed vertically. Accordingly, at least two valves 80*a* and 80*b* may be used in the flow path switching device used in FIGS. 14A and 14B.

The valve 80 described in FIGS. 14*a* and 14*b* can be applied to the flow path switching device of FIGS. 9 to 12*c*, and other configurations excluding the valve 80*a*, 80*b* can be understood in the same way.

The valve 80*a*, 80*b* used in FIGS. 14A and 14B may have the same shape and function as the valve 80 used in FIGS. 13A and 13B. FIGS. 14A and 14B show a state in which the second valve 80*b* closes the second flow path connection portion 70*b*, and show a state in which the first valve 80*a* opens the plurality of inner outflow pipes and inner inflow pipes.

When disposed as shown in FIG. 14A, the first hole 88*a* communicates with the first upper outflow hole 54*a* formed in the first inner outflow pipe 52, and the second hole 88*b* communicates with the first nozzle hole 36*a* formed in the first nozzle 34*a*.

In addition, as shown in FIG. 14B, when the first hole 88*a* communicates with the first nozzle hole 36*a* formed in the first nozzle 34*a*, the second hole 88*b* communicates with the second upper outflow hole 58*a* formed in the second inner outflow pipe 56, and the second hole 88*b* communicates with the first nozzle hole 36*a* formed in the first nozzle 34*a*.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A flow path switching device comprising:
a case comprising a first nozzle into which fluid flows from an indoor unit, a second nozzle which sends fluid to the indoor unit, a plurality of inner outflow pipes through which fluid supplied from the first nozzle flows, a plurality of inner inflow pipes through which the fluid supplied to the second nozzle flows, and a flow path connection portion in which a space is formed to communicate the plurality of inner outflow pipes with the first nozzle or to communicate the plurality of inner inflow pipes with the second nozzle;
a valve which is rotatably disposed in the space of the flow path connection portion, and has a first chamber connecting one of the plurality of inner outflow pipes and the first nozzle according to disposition, and a second chamber connecting one of the plurality of inner inflow pipes and the second nozzle according to disposition; and
a motor which is disposed in one side of the valve, and rotates the valve,
wherein the plurality of inner outflow pipes and the plurality of inner inflow pipes are disposed in the same one side of the flow path connection portion and are spaced apart from each other in a direction in which a rotation shaft around which the valve rotates is formed.

2. The flow path switching device of claim 1, wherein the first nozzle is disposed between the first inner outflow pipe and the second inner outflow pipe in a direction in which the rotation shaft of the valve extends.

3. The flow path switching device of claim 1, wherein the plurality of inner outflow pipes include a first inner outflow pipe through which fluid flows to a first heat exchanger and a second inner outflow pipe through which fluid flows to a second heat exchanger,
wherein the first inner outflow pipe and the second inner outflow pipe are disposed in an opposite direction to the first nozzle based on the rotation shaft of the valve.

4. The flow path switching device of claim 3, wherein the first inner outflow pipe and the second inner outflow pipe are spaced apart from each other in a direction parallel to the rotation shaft of the valve, and in the first nozzle, a first nozzle hole opened in a direction perpendicular to the rotation shaft of the valve is formed between the first inner outflow pipe and the second inner outflow pipe spaced apart from each other.

5. The flow path switching device of claim 4, wherein the valve comprises a guide plate forming an inclined surface to guide the fluid flowing from the first nozzle to the first inner outflow pipe or the second inner outflow pipe.

6. The flow path switching device of claim 5, wherein the guide plate is disposed below the first nozzle to send the fluid supplied from the first nozzle to the first inner outflow pipe or the second inner outflow pipe according to disposition of the valve.

7. The flow path switching device of claim 5, wherein the guide plate has one end which is in contact with one end portion of the first nozzle to guide the fluid supplied from the first nozzle to the first inner outflow pipe, and
the other end which is in contact with the other end portion of the first nozzle to guide the fluid supplied from the first nozzle to the second inner outflow pipe.

8. The flow path switching device of claim 5,
wherein a first outflow hole communicating with the first space of the flow path connection portion is formed in the first inner outflow pipe,
wherein a second outflow hole communicating with the first space of the flow path connection portion is formed in the second inner outflow pipe,
wherein the first nozzle hole is formed in an inner range of one end and the other end of the guide plate, and
wherein the first outflow hole and the second outflow hole are formed in an outer range of one end and the other end of the guide plate.

9. The flow path switching device of claim 1, wherein the valve comprises:
a valve body which forms an outer shape and has the first chamber and the second chamber formed therein; and
a partition plate which is disposed inside the valve body, and partitions the first chamber and the second chamber.

10. The flow path switching device of claim 9, wherein a guide plate forming an inclined surface is disposed, in the first chamber, to guide the fluid flowing from the first nozzle to the first inner outflow pipe or the second inner outflow pipe,
a first upper hole and a second lower hole, which are formed in an opposite direction in one end of the guide plate, are formed in one side of the valve body,
a second upper hole and a first lower hole, which are formed in an opposite direction in the other end of the guide plate, are formed in the other side of the valve body, and
each of the first upper hole and the first lower hole, when disposed adjacent to the first nozzle, communicates with a first nozzle hole formed in the first nozzle.

11. The flow path switching device of claim 10, wherein the first upper hole communicates with the first nozzle hole or the first inner outflow pipe according to disposition of the valve, the second upper hole communicates with the first nozzle hole or the second inner outflow pipe according to disposition of the valve, the first lower hole communicates with the first inner outflow pipe according to disposition of the valve, and the second lower hole communicates with the second inner outflow pipe according to disposition of the valve.

12. The flow path switching device of claim 10, wherein the first upper hole and the first lower hole are disposed to face each other, the second upper hole and the second lower hole are disposed to face each other, the first upper hole and the second lower hole are disposed parallel to the rotation shaft of the valve, and the second upper hole and the first lower hole are disposed parallel to the rotation shaft of the valve.

13. The flow path switching device of claim 9, wherein the plurality of inner inflow pipes comprise a first inner inflow pipe through which fluid heat-exchanged with a refrigerant flows through a first heat exchanger, and a second inner inflow pipe through which fluid heat-exchanged with a refrigerant flows through a second heat exchanger, wherein the first inner inflow pipe and the second inner inflow pipe are disposed parallel to the rotation shaft of the valve.

14. The flow path switching device of claim 13, wherein the second nozzle is extended in a direction parallel to the rotation shaft of the valve, in a distal end of the flow path connection portion.

15. The flow path switching device of claim 14, wherein a first inflow hole communicating with the second space is formed in the first inner inflow pipe, and a second inflow hole communicating with the second space is formed in the second inner inflow pipe, and wherein a first valve hole communicating with the first inflow hole according to disposition of the valve, a second valve hole communicating with the second inflow hole according to disposition of the valve, and a third valve hole communicating with the second nozzle are formed in the valve body.

16. The flow path switching device of claim 9, wherein in a circumferential surface of the valve body, a first hole which communicates with a first nozzle hole formed in the first nozzle or communicates with the first inner outflow pipe according to disposition, and a second hole which communicates with the first nozzle hole or the second inner outflow pipe according to disposition are formed, wherein the first hole and the second hole are disposed in opposite directions to each other, and are formed to overlap in a portion where the first nozzle hole is formed.

17. The flow path switching device of claim 1, wherein the case comprises a plurality of flow path connection portions spaced apart from each other in a direction in which the plurality of inner inflow pipes and the plurality of inner outflow pipes are extended, wherein a plurality of valves connecting the plurality of inner inflow pipes, the plurality of inner outflow pipes, and a plurality of indoor units, respectively, are disposed in the plurality of flow path connection portions.

18. A flow path switching device comprising:

a case comprising a first upper nozzle into which fluid flows from a first indoor unit, a second upper nozzle which sends fluid to the first indoor unit, a first lower nozzle into which fluid flows from a second indoor unit, a second lower nozzle which sends fluid to the second indoor unit, a plurality of inner outflow pipes through which fluid supplied from the first upper nozzle or the first lower nozzle flows, a plurality of inner inflow pipes through which fluid supplied to the second upper nozzle or the second lower nozzle flows, a first flow path connection portion which has an upper space for communicating the plurality of inner outflow pipes and the first upper nozzle or communicating the plurality of inner inflow pipes and the second upper nozzle, and a second flow path connection portion which has a lower space for communicating the plurality of inner outflow pipes and the first lower nozzle or communicating the plurality of inner inflow pipes and the second lower nozzle;

a first valve which is rotatably disposed in the upper space of the first flow path connection portion, connects one of the plurality of inner outflow pipes and the first upper nozzle according to disposition, and connects one of the plurality of inner inflow pipes and the second upper nozzle;

a second valve which is rotatably disposed in the lower space of the second flow path connection portion, connects one of the plurality of inner outflow pipes and the first lower nozzle according to disposition, and connects one of the plurality of inner inflow pipes and the second lower nozzle;

a first motor which is disposed in one side of the first valve, and rotates the first valve; and a second motor which is disposed in one side of the second valve, and rotates the second valve, wherein the plurality of inner outflow pipes and the plurality of inner inflow pipes are disposed between the first flow path connection portion and the second flow path connection portion, and are disposed spaced apart from each other in a direction in which a first rotation shaft on which the first valve rotates or a second rotation shaft on which the second valve rotates is formed.

19. The flow path switching device of claim 18, wherein in each of the plurality of inner outflow pipes and the plurality of inner inflow pipes, a plurality of upper outflow holes and a plurality of upper inflow holes are formed in one side facing the first flow path connection portion, and a plurality of lower outflow holes and a plurality of lower inflow holes are formed in the other side facing the second flow path connection portion.

* * * * *